(12) United States Patent
Zhao et al.

(10) Patent No.: US 10,889,921 B2
(45) Date of Patent: Jan. 12, 2021

(54) NONWOVENS HAVING ALIGNED SEGMENTED FIBERS

(71) Applicant: AVINTIV Specialty Materials Inc., Charlotte, NC (US)

(72) Inventors: Rongguo Zhao, Mooresville, NC (US); Nyle Bishop, Mooresville, NC (US)

(73) Assignee: AVINTIV Specialty Materials, Inc., Charlotte, NC (US)

( * ) Notice: Subject to any disclaimer, the term of this patent is extended or adjusted under 35 U.S.C. 154(b) by 16 days.

(21) Appl. No.: 15/292,223

(22) Filed: Oct. 13, 2016

(65) Prior Publication Data

US 2017/0107651 A1  Apr. 20, 2017

Related U.S. Application Data

(60) Provisional application No. 62/242,617, filed on Oct. 16, 2015.

(51) Int. Cl.
| | | |
|---|---|---|
| *B32B 5/20* | (2006.01) | |
| *D04H 1/4391* | (2012.01) | |
| *D04H 1/74* | (2006.01) | |
| *B29C 55/04* | (2006.01) | |
| *B32B 5/02* | (2006.01) | |
| *B32B 27/32* | (2006.01) | |

(Continued)

(52) U.S. Cl.
CPC ........... *D04H 1/4391* (2013.01); *B29C 55/04* (2013.01); *B32B 5/022* (2013.01); *B32B 27/32* (2013.01); *D01D 5/20* (2013.01); *D04H 1/541* (2013.01); *D04H 1/74* (2013.01); *B29K 2623/12* (2013.01); *B29L 2007/008* (2013.01); *B32B 2305/20* (2013.01); *D01F 6/06* (2013.01)

(58) Field of Classification Search
CPC ........ D04H 3/018; D04H 1/4391; D01D 5/20; B32B 5/02; B32B 5/022; B32B 5/08; B32B 5/22; B32B 5/24
See application file for complete search history.

(56) References Cited

U.S. PATENT DOCUMENTS

| | | | |
|---|---|---|---|
| 2,932,850 A | | 4/1960 | McNeill et al. |
| 3,444,682 A | * | 5/1969 | Denti ....................... D02G 1/18 57/206 |

(Continued)

FOREIGN PATENT DOCUMENTS

| | | | |
|---|---|---|---|
| CN | 201485541 U | * | 5/2010 |
| CN | 102206880 A | | 10/2011 |

(Continued)

OTHER PUBLICATIONS

Machine translation of CN 201,485,541U. (Year: 2020).*

(Continued)

*Primary Examiner* — Z. Jim Yang
(74) *Attorney, Agent, or Firm* — Burr & Forman LLP

(57) ABSTRACT

Nonwoven fabrics suitable for a wide variety of applications (e.g., healthcare, filtration, industrial, packaging, etc.) are provided. In one aspect, the nonwoven fabric includes a plurality of segmented fibers. Each of the plurality of segmented fibers may comprise a fiber axis and a plurality of alternating larger diameter and smaller diameter segments along the fiber axis. The plurality of segmented fibers may be substantially aligned in a first direction.

21 Claims, 12 Drawing Sheets

(51) Int. Cl.
   *D01D 5/20*   (2006.01)
   *D04H 1/541*  (2012.01)
   *D01F 6/06*       (2006.01)
   *B29K 623/00*     (2006.01)
   *B29L 7/00*       (2006.01)

(56) References Cited

U.S. PATENT DOCUMENTS

| | | | | |
|---|---|---|---|---|
| 3,557,801 A * | 1/1971 | Jamison | A24D 3/10 | 131/342 |
| 4,389,364 A * | 6/1983 | Endo | D01D 5/20 | 264/167 |
| 4,414,801 A * | 11/1983 | Blackmon | D01D 5/20 | 264/167 |
| 4,613,470 A * | 9/1986 | Aftalion | D01D 5/20 | 264/464 |
| 5,145,727 A * | 9/1992 | Potts | B32B 5/08 | 428/198 |
| 5,320,891 A * | 6/1994 | Levy | D04H 1/74 | 428/108 |
| 5,492,753 A * | 2/1996 | Levy | D06C 3/00 | 428/219 |
| 5,700,254 A * | 12/1997 | McDowall | A61F 13/15617 | 604/378 |
| 2003/0171053 A1* | 9/2003 | Sanders | B32B 5/26 | 442/340 |
| 2006/0094320 A1* | 5/2006 | Chen | D04H 1/4391 | 442/340 |
| 2007/0184265 A1* | 8/2007 | Ranganathan | C04B 14/48 | 428/375 |
| 2008/0311814 A1* | 12/2008 | O'Sickey | B29C 55/06 | 442/329 |
| 2010/0075103 A1* | 3/2010 | Miyamoto | B32B 5/06 | 428/114 |
| 2010/0254961 A1 | 10/2010 | Nishio et al. | | |
| 2011/0003524 A1* | 1/2011 | Claasen | C08F 10/00 | 442/329 |
| 2013/0112625 A1* | 5/2013 | Bahukudumbi | B01J 20/28007 | 210/660 |
| 2013/0125912 A1* | 5/2013 | Tojo | A61K 8/73 | 132/200 |
| 2013/0143019 A1* | 6/2013 | Wood | D04H 3/05 | 428/219 |
| 2013/0172842 A1* | 7/2013 | Mitsuno | D04H 1/4391 | 604/367 |
| 2013/0280481 A1* | 10/2013 | Mitsuno | D04H 5/06 | 428/131 |
| 2014/0234575 A1* | 8/2014 | Mitsuno | B32B 5/145 | 428/137 |
| 2015/0147530 A1* | 5/2015 | Mitsuno | B32B 7/08 | 428/167 |
| 2015/0322607 A1* | 11/2015 | Mitsuno | D04H 13/00 | 442/329 |
| 2016/0051917 A1* | 2/2016 | Seeberger | B01D 46/0001 | 55/521 |
| 2016/0258092 A1* | 9/2016 | Yoshioka | D04H 3/018 | |
| 2018/0078673 A1* | 3/2018 | Seo | D01F 6/92 | |
| 2018/0179668 A1* | 6/2018 | Topolkaraev | D01D 5/247 | |

FOREIGN PATENT DOCUMENTS

| | | | | |
|---|---|---|---|---|
| DE | 102014209606 A1 * | 11/2015 | | D01D 5/20 |
| EP | 0604737 A1 | 7/1994 | | |
| EP | 1200661 B1 | 7/2004 | | |
| EP | 2589693 A1 | 5/2013 | | |
| WO | 2009032868 A1 | 3/2009 | | |

OTHER PUBLICATIONS

International Search Report and Written Opinion of corresponding application No. PCT/US2016/056818, dated Jan. 3, 2017, all enclosed pages cited.

Second Written Opinion of the International Preliminary Examining Authority in corresponding international application No. PCT/US2016/056818, dated Sep. 6, 2017, all enclosed pages cited.

Communication pursuant to Article 94(3) EPC of European Patent Application No. 16788863.5 dated Apr. 2, 2019, all enclosed pages cited.

Office Action (with translation) issued in corresponding Chinese Patent Application No. 201680074105.9 dated Jun. 17, 2020, all enclosed pages cited.

\* cited by examiner

US 10,889,921 B2

NONWOVENS HAVING ALIGNED SEGMENTED FIBERS

PRIORITY CLAIM

This application claims priority under 35 U.S.C. § 119(e) to U.S. Provisional Application Ser. No. 62/242,617, filed on Oct. 16, 2015, which is expressly incorporate reference herein in its entirety.

TECHNICAL FIELD

The presently-disclosed invention relates generally to men fabrics having various commercial applications.

BACKGROUND

Nonwovens have been engineered to meet stringent requirements for nearly countless applications from daily life to sophisticated life sciences. Although nonwovens differ significantly from one another, they all have fibers, continuous filaments, or staple fibers having a relatively constant fiber diameter along the fiber axis. While conventional nonwovens are frequently used in various commercial applications, these conventional nonwovens do not provide a variety of desirable physical properties, such as superior bonding and sealing characteristics, which may be required by, for example, the healthcare industry.

Therefore there at least remains a need in the art for nonwoven fabrics having improved physical properties, such as bonding and sealing characteristics.

SUMMARY OF INVENTION

One or more embodiments of the invention may address one or more of the aforementioned problems. Certain embodiments according to the invention provide nonwoven fabrics suitable for a wide variety of applications (e.g., healthcare, filtration, industrial, packaging, etc.). In one aspect, the nonwoven fabric includes a plurality of segmented fibers. Each of the plurality of segmented fibers may comprise a fiber axis and a plurality of alternating larger diameter and smaller diameter segments along the fiber axis. The plurality of segmented fibers may be substantially aligned in a first direction.

In accordance with certain embodiments of the invention, at least one or each of the plurality of segmented fibers may be substantially continuous. In this regard, substantially all of the fibers forming the nonwoven fabrics according to certain embodiments of the invention may be segmented fibers as disclosed herein. In certain embodiments of the invention, the fibers forming the nonwoven fabrics according to certain embodiments of the invention may comprise a blend of segmented fibers as disclosed herein and non-segmented fibers. In some embodiments of the invention, the plurality of alternating larger diameter segments and smaller diameter segments may be arranged in a coarse-fine-coarse-fine alternating pattern.

In accordance with certain embodiments of the invention, the first direction may comprise a cross direction. In some embodiments of the invention, the plurality of segmented fibers may comprise a machine direction elongation and a cross direction elongation, and the machine direction elongation may be greater than the cross direction elongation. In such embodiments of the invention, the machine direction elongation at break may be at least 3 times longer than the cross direction elongation at break. In further embodiments of the invention, the plurality of segmented fibers may comprise a cross direction tensile strength and a machine direction tensile strength, and the cross direction tensile strength may be at least 2 times stronger than the machine direction tensile strength, for example, at 50% elongation or at break.

In accordance with certain embodiments of the invention, at least one of the larger diameter segments may have a diameter from about 1 µm to about 100 µm, and at least one of the smaller diameter segments may have a diameter from about 0.5 µm to about 25 µm. In other embodiments of the invention, at least one of the larger diameter segments may have a diameter from about 1.5 µm to about 50 µm, and at least one of the smaller diameter segments may have a diameter from about 0.75 µm to about 20 µm. In further embodiments of the invention, at least one of the larger diameter segments may have a diameter from about 2 µm to about 25 µm, and at least one of the smaller diameter segments may have a diameter from about 1 µm to about 18 µm. According to certain embodiments of the invention, the plurality of segmented fibers may have an average fiber diameter from about 0.1 µm to about 100 µm. In other embodiments of the invention, the plurality of segmented fibers may have an average fiber diameter from about 0.5 µm to about 50 µm. In further embodiments of the invention, the plurality of segmented fibers may have an average fiber diameter from about 1 µm to about 25 µm.

In accordance with certain embodiments of the invention, the plurality of alternating larger diameter segments and smaller diameter segments may have a fiber diameter change $\Delta d_f$ between a first larger diameter segment and a first smaller diameter segment, and the fiber diameter change $\Delta d_f$ may comprise from about 5% to about 60%. In other embodiments of the invention, the fiber diameter change $\Delta d_f$ may comprise from about 20% to about 50%. In further embodiments of the invention, the fiber diameter change $\Delta d_f$ may comprise from about 30% to about 40%. According to certain embodiments of the invention, at least one of the larger diameter segments may have a diameter that is at least 6% larger than at least one of the smaller diameter segments. In some embodiments of the invention, at least one of the larger diameter segments may have a diameter that is at least 10% larger than at least one of the smaller diameter segments.

In accordance with certain embodiments of the invention, the nonwoven fabric may comprise a transition region between the first larger diameter segment and the first smaller diameter segment. In such embodiments of the invention, the transition region may comprise a shoulder or shoulder-like structure.

In accordance with certain embodiments of the invention, the plurality of segmented fibers may comprise meltspun fibers. In certain embodiments of the invention, the plurality of segmented fibers may comprise melt blown fibers. In further embodiments of the invention, the plurality of segmented fibers may comprise spunbond fibers. In certain embodiments of the invention, the plurality of segmented fibers may comprise extensible non-elastic filaments. In some embodiments of the invention, the plurality of segmented fibers may comprise multicomponent fibers. In such embodiments of the invention, the plurality of segmented fibers may comprise sheath/core bicomponent fibers. In other embodiments of the invention, the plurality of segmented fibers may comprise side-by-side bicomponent fibers. According to certain embodiments of the invention, the plurality of segmented fibers may comprise at least one of a polypropylene, a polyethylene, a propylene-ethylene random copolymer, a propylene-ethylene block copolymer, a polyethylene terephthalate, a polybutylene terephthalate, a polytrimethylene terephthalate, a polylactic acid, a polyamide, or any combination thereof. In some embodiments of the invention, the plurality of segmented fibers may comprise a polypropylene. In such embodiments of the invention, the polypropylene may have a melt flow rate from about 5 g/10 min to about 2000 g/10 min, tested at 230° C. according to ASTM 1238. In other embodiments of the invention, the polypropylene may have a melt flow rate from about 20 g/10 min to about 500 g/10 min tested at 230° C. according to ASTM 1238. In further embodiments of the invention, the polypropylene may have a melt flow rate from about 25 g/10 min to about 100 g/10 min tested at 230° C. according to ASTM 1238. In some embodiments of the invention, the polypropylene may have a melt flow rate of about 35 g/10 min tested at 230° C. according to ASTM 1238.

In accordance with certain embodiments of the invention, the nonwoven fabric may have a basis weight from about 1 to about 400 grams-per-square-meter (gsm). In other embodiments of the invention, the nonwoven fabric may have a basis weight from about 1 gsm to about 200 gsm. In further embodiments of the invention, the nonwoven fabric may have a basis weight from about 1 gsm to about 100 gsm. In some embodiments of the invention, the nonwoven fabric may have a basis weight of about 40 gsm.

In accordance with certain embodiments of the invention, the plurality of segmented fibers may comprise about 0.1 wt % to about 10 wt % of an additive. In such embodiments of the invention, the additive may comprise at least one of a calcium carbonate additive, a titanium oxide additive, a $BaSO_4$ additive, a talc additive, a nanoclay additive, or any combination thereof. According to certain embodiments of the invention, the nanofiber fabric may further comprise at least one of a colorant, a fluorochemical, an antistatic agent, a hydrophilic agent, mineral fine particles, or any combination thereof.

In another aspect, certain embodiments of the invention provide a process for forming a nonwoven fabric. The process includes forming a nonwoven web of, for example, partially-drawn fibers, stretching the nonwoven web at least twice (e.g., at least 3 times, 4 times, 5 times, 6 times, etc.) in a first direction to form a plurality of segmented fibers, and bonding the plurality of segmented fibers. Each of the plurality of segmented fibers may comprise a fiber axis and a plurality of alternating segments of substantially different fiber diameters along the fiber axis. The plurality of segmented fibers may be substantially aligned in the first direction.

In accordance with certain embodiments of the invention, forming the nonwoven web of partially-drawn fibers may comprise at least one of a melt blowing process, an electroblowing process, a melt-film fibrillation process, an electrospinning process, a solution spinning process, a meltspinning process, a spunbonding process, or any combination thereof. In some embodiments of the invention, forming the nonwoven web of partially-drawn fibers may comprise a melt blowing process.

According to certain embodiments of the invention, stretching the nonwoven web to form a plurality of segmented fibers may comprise feeding the nonwoven web of fibers, such as partially-drawn fibers, through a first stretching station to incrementally stretch the nonwoven web in the first direction, spreading the nonwoven web in the first direction, and feeding the stretched and spread nonwoven web through a second stretching station to further incrementally stretch the nonwoven web in the first direction. The first stretching station may have a first incremental stretching distance, the second stretching station may have a second incremental stretching distance, and the second incremental stretching distance may be less than or equal to the first incremental stretching distance. In such embodiments of the invention, the plurality of segmented fibers may be substantially aligned in the first direction after stretching at least 3 times in the first direction. In further embodiments of the invention, the plurality of segmented fibers may be substantially aligned in the first direction after stretching 4 times in the first direction.

According to certain embodiments of the invention, bonding the plurality of segmented fibers may comprise bonding at a multiplicity of bonding sites. In some embodiments of the invention, bonding the plurality of segmented fibers comprises at least one of thermal calendering, ultrasonic bonding, hydroentangling, needle punching, chemical resin bonding, stitch bonding, or any combination thereof.

In processes according to certain embodiments of the invention, each of the plurality of segmented fibers may be substantially continuous. In some embodiments of the invention, the plurality of alternating larger diameter segments and smaller diameter segments may be arranged in a coarse-fine-coarse-fine alternating pattern.

In processes according to certain embodiments of the invention, the first direction may comprise a cross direction. In some embodiments of the invention, the plurality of segmented fibers may comprise a machine direction elongation and a cross direction elongation, and the machine direction elongation may be greater than the cross direction elongation. In such embodiments of the invention, the machine direction elongation at break may be at least 3 times longer than the cross direction elongation at break. In further embodiments of the invention, the plurality of segmented fibers may comprise a cross direction tensile strength and a machine direction tensile strength, and the cross direction tensile strength may be at least 2 times stronger than the machine direction tensile strength, for example, at 50% elongation or at break.

In processes according to certain embodiments of the invention, at least one of the larger diameter segments may have a diameter from about 1 μm to about 100 μm, and at least one of the smaller diameter segments may have a diameter from about 0.5 μm to about 25 μm. In other embodiments of the invention, at least one of the larger diameter segments may have a diameter from about 1.5 μm to about 50 μm, and at least one of the smaller diameter segments may have a diameter from about 0.75 μm to about 20 μm. In further embodiments of the invention, at least one of the larger diameter segments may have a diameter from about 2 μm to about 25 μm, and at least one of the smaller diameter segments may have a diameter from about 1 μm to about 18 μm. According to certain embodiments of the invention, the plurality of segmented fibers may have an average fiber diameter from about 0.1 μm to about 100 μm. In other embodiments of the invention, the plurality of segmented fibers may have an average fiber diameter from about 0.5 μm to about 50 μm. In further embodiments of the invention, the plurality of segmented fibers may have an average fiber diameter from about 1 μm to about 25 μm.

In processes according to certain embodiments of the invention, the plurality of alternating larger diameter segments and smaller diameter segments may have a fiber diameter change $\Delta d_f$ between a first larger diameter segment and a first smaller diameter segment, and the fiber diameter change $\Delta d_f$ may comprise from about 5% to about 60%. In other embodiments of the invention, the fiber diameter change $\Delta d_f$ may comprise from about 20% to about 50%. In further embodiments of the invention, the fiber diameter change $\Delta d_f$ may comprise from about 30% to about 40%. According to certain embodiments of the invention, at least one of the larger diameter segments may have a diameter that is at least 6% larger than at least one of the smaller diameter segments. In some embodiments of the invention, at least one of the larger diameter segments may have a diameter that is at least 10% larger than at least one of the smaller diameter segments.

In processes according to certain embodiments of the invention, the nonwoven fabric may comprise a transition region between the first larger diameter segment and the first smaller diameter segment. In such embodiments of the invention, the transition region may comprise a shoulder or shoulder-like structure.

In processes according to certain embodiments of the invention, the plurality of segmented fibers may comprise meltspun fibers. In certain embodiments of the invention, the plurality of segmented fibers may comprise melt blown fibers. In further embodiments of the invention, the plurality of segmented fibers may comprise spunbond fibers. In certain embodiments of the invention, the plurality of segmented fibers may comprise extensible non-elastic filaments. In some embodiments of the invention, the plurality of segmented fibers may comprise multicomponent fibers. In such embodiments of the invention, the plurality of segmented fibers may comprise sheath/core bicomponent fibers. In other embodiments of the invention, the plurality of segmented fibers may comprise side-by-side bicomponent fibers. According to certain embodiments of the invention, the plurality of segmented fibers may comprise at least one of a polypropylene, a polyethylene, a propylene-ethylene random copolymer, a propylene-ethylene block copolymer, a polyethylene terephthalate, a polybutylene terephthalate, a polytrimethylene terephthalate, a polylactic acid, a polyamide, or any combination thereof. In some embodiments of the invention, the plurality of segmented fibers may comprise a polypropylene. In such embodiments of the invention, the polypropylene may have a melt flow rate from about 5 g/10 min to about 2000 g/10 min tested at 230° C. according to ASTM 1238. In other embodiments of the invention, the polypropylene may have a melt flow rate from about 20 g/10 min to about 500 g/10 min tested at 230° C. according to ASTM 1238. In further embodiments of the invention, the polypropylene may have a melt flow rate from about 25 g/10 min to about 100 g/10 min tested at 230° C. according to ASTM 1238. In some embodiments of the invention, the polypropylene may have a melt flow rate of about 35 g/10 min tested at 230° C. according to ASTM 1238.

In processes according to certain embodiments of the invention, the nonwoven fabric may have a basis weight from about 1 gsm to about 400 gsm. In other embodiments of the invention, the nonwoven fabric may have a basis weight from about 1 gsm to about 200 gsm. In further embodiments of the invention, the nonwoven fabric may have a basis weight from about 1 gsm to about 100 gsm. In some embodiments of the invention, the nonwoven fabric may have a basis weight of about 40 gsm.

In processes according to certain embodiments of the invention, the plurality of segmented fibers may comprise about 0.1 wt % to about 10 wt % of an additive. In such embodiments of the invention, the additive may comprise at least one of a calcium carbonate additive, a titanium oxide additive, a talc additive, a nanoclay additive, or any combination thereof. According to certain embodiments of the invention, the nanofiber fabric may further comprise at least one of a colorant, a fluorochemical, an antistatic agent, a hydrophilic agent, mineral fine particles, or any combination thereof.

In yet another aspect, certain embodiments of the invention provide a multi-layer composite. The multi-layer composite includes at least two layers, such that at least one layer comprises a nonwoven fabric. The nonwoven fabric may comprise a plurality of segmented fibers such that each of the plurality of segmented fibers may comprise a fiber axis and a plurality of alternating larger diameter segments and smaller diameter segments along the fiber axis. The plurality of segmented fibers may be substantially aligned in a first direction.

In accordance with certain embodiments of the invention, the multi-layer composite may further comprise at least one non-segmented layer, such as an additional nonwoven layer which is devoid of segmented fibers. In certain embodiments of the invention, the multi-layer composite may comprise at least one film layer. In this regard, multi-layer composites according to certain embodiments of the invention may comprise (i) at least one layer comprising a nonwoven fabric including segmented fibers as disclosed herein, (ii) at least one nonwoven or woven layer being devoid of segmented fibers as disclosed herein, and/or (iii) at least one film layer.

In accordance with certain embodiments of the invention, the at least two layers may be cross-lapped and bonded. In certain embodiments, for example, a first nonwoven fabric comprising segmented fibers substantially aligned or oriented in a first direction may be laid directly or indirectly onto or over a second nonwoven fabric comprising segmented fibers substantially aligned or oriented in a second direction, in which the first direction and the second direction are not the same. For instance, the first direction may be considered to be at 0° (as a point of reference) and the second direction may comprise 90° relative to the first direction (e.g., from between 5-175°, 20-160°, 40-140°, 60-120°, 80-100° relative to the first direction. In other embodiments of the invention, the at least two layers may be layered together (e.g., each layer being laid with segmented fibers being substantially aligned or oriented in substantially the same direction) and laminated. In certain embodiments of the invention, the at least two layers may be laminated via ultrasonic bonding.

In multi-layer composites according to certain embodiments of the invention, each of the plurality of segmented fibers may be substantially continuous. In some embodiments of the invention, the plurality of alternating larger diameter segments and smaller diameter segments may be arranged in a coarse-fine-coarse-fine alternating pattern.

In multi-layer composites according to certain embodiments of the invention, the first direction may comprise a cross direction. In some embodiments of the invention, the plurality of segmented fibers may comprise a machine direction elongation and a cross direction elongation, and the machine direction elongation may be greater than the cross direction elongation. In such embodiments of the invention, the machine direction elongation at break may be at least 3 times longer than the cross direction elongation at break for a given layer of the multi-layer composite. In further embodiments of the invention, the plurality of segmented fibers for a given layer of the multi-layer composite may comprise a cross direction tensile strength and a machine direction tensile strength, and the cross direction tensile strength may be at least 2 times stronger than the machine direction tensile strength, for example, at 50% elongation or at break. In accordance with certain multi-layer composite embodiments of the invention, the overall machine direction and cross direction properties of the multi-layer composite may vary from the individual layers of the multi-layer composite and may also vary, for example, depending on the lay-up orientations of the respective nonwoven fabric layers relative to each other. As noted above, each of the respective nonwoven fabric layers may be independently laid relative to adjacent nonwoven fabric layers. By way of example only, embodiments of the invention may comprise a first nonwoven fabric comprising segmented fibers substantially aligned or oriented in a first direction laid directly or indirectly onto or over a second nonwoven fabric comprising segmented fibers substantially aligned or oriented in a second direction, in which the first direction and the second direction are not the same. For instance, the first direction may be considered to be at 0° (as a point of reference) and the second direction may comprise 90° relative to the first direction (e.g., from between 5-175°, 20-160°, 40-140°, 60-120°, 80-100° relative to the first direction. In this regard, the overall machine direction and cross direction properties of the multi-layer composite may be tailored or configured to achieve one or more desired overall machine direction and/or cross direction properties by varying, for example, the number of individual nonwoven fabric layers (e.g., in which some or all of the individual nonwoven fabric layers comprise a plurality of segmented fibers as described herein). Additionally or alternatively to, the overall machine direction and cross direction properties of the multi-layer composite may be tailored or configured to achieve one or more desired overall machine direction and/or cross direction properties by varying the respective lay-up orientations (as described above) of each individual nonwoven fabric layers (e.g., in which some or all of the individual nonwoven fabric layers comprise a plurality of segmented fibers as described herein). By way of example only, certain multi-layer composite embodiments of the invention may comprise a plurality of individual nonwoven fabric layers, in which each nonwoven fabric layer is stretched and laid-up in the same or common direction (e.g., cross direction). After bonding such example embodiments of the invention, the cross direction tensile strength may be significantly higher than the machine direction tensile strength for the overall multi-layer composite. In other multi-layer composite embodiments of the invention, for example, a plurality of individual nonwoven fabric layers may be cross-lapped relative to adjacent individual nonwoven fabric layers (e.g., from between 5-175°, 20-160°, 40-140°, 60-120°, 80-100° relative to adjacent individual nonwoven fabric layers). After bonding such example embodiments of the invention, the difference of tensile strength between the cross direction and the machine direction may be much less significant. In this regard, certain multi-layer composite embodiments according to the invention may be configured or tailored for realization of one or more desired overall machine direction and/or cross direction properties.

In multi-layer composites according to certain embodiments of the invention, at least one of the larger diameter segments may have a diameter from about 1 μm to about 100 μm, and at least one of the smaller diameter segments may have a diameter from about 0.5 μm to about 25 μm. In other embodiments of the invention, at least one of the larger diameter segments may have a diameter from about 1.5 μm to about 50 μm, and at least one of the smaller diameter segments may have a diameter from about 0.75 μm to about 20 μm. In further embodiments of the invention, at least one of the larger diameter segments may have a diameter from about 2 μm to about 25 μm, and at least one of the smaller diameter segments may have a diameter from about 1 μm to about 18 μm. According to certain embodiments of the invention, the plurality of segmented fibers may have an average fiber diameter from about 0.1 μm to about 100 μm. In other embodiments of the invention, the plurality of segmented fibers may have an average fiber diameter from about 0.5 μm to about 50 μm. In further embodiments of the invention, the plurality of segmented fibers may have an average fiber diameter from about 1 μm to about 25 μm.

In multi-layer composites according to certain embodiments of the invention, the plurality of alternating larger diameter segments and smaller diameter segments may have a fiber diameter change $\Delta d_f$ between a first larger diameter segment and a first smaller diameter segment, and the fiber diameter change $\Delta d_f$ may comprise from about 5% to about 60%. In other embodiments of the invention, the fiber diameter change $\Delta d_f$ may comprise from about 20% to about 50%. In further embodiments of the invention, the fiber diameter change $\Delta d_f$ may comprise from about 30% to about 40%. According to certain embodiments of the invention, at least one of the larger diameter segments may have a diameter that is at least 6% larger than at least one of the smaller diameter segments. In some embodiments of the invention, at least one of the larger diameter segments may have a diameter that is at least 10% larger than at least one of the smaller diameter segments.

In multi-layer composites according to certain embodiments of the invention, the nonwoven fabric may comprise a transition region between the first larger diameter segment and the first smaller diameter segment. In such embodiments of the invention, the transition region may comprise a shoulder or shoulder-like structure.

In multi-layer composites according to certain embodiments of the invention, the plurality of segmented fibers may comprise meltspun fibers. In certain embodiments of the invention, the plurality of segmented fibers may comprise melt blown fibers. In further embodiments of the invention, the plurality of segmented fibers may comprise spunbond fibers. In certain embodiments of the invention, the plurality of segmented fibers may comprise extensible non-elastic filaments. In some embodiments of the invention, the plurality of segmented fibers may comprise multicomponent fibers. In such embodiments of the invention, the plurality of segmented fibers may comprise sheath/core bicomponent fibers. In other embodiments of the invention, the plurality of segmented fibers may comprise side-by-side bicomponent fibers. According to certain embodiments of the invention, the plurality of segmented fibers may comprise at least one of a polypropylene, a polyethylene, a propylene-ethylene random copolymer, a propylene-ethylene block copolymer, a polyethylene terephthalate, a polybutylene terephthalate, a polytrimethylene terephthalate, a polylactic acid, a polyamide, or any combination thereof. In some embodiments of the invention, the plurality of segmented fibers may comprise a polypropylene. In such embodiments of the invention, the polypropylene may have a melt flow rate from about 5 g/10 min to about 2000 g/10 min tested at 230° C. according to ASTM 1238. In other embodiments of the invention, the polypropylene may have a melt flow rate from about 20 g/10 min to about 500 g/10 min tested at 230° C. according to ASTM 1238. In further embodiments of the invention, the polypropylene may have a melt flow rate from about 25 g/10 min to about 100 g/10 min tested at 230° C. according to ASTM 1238. In some embodiments of the invention, the polypropylene may have a melt flow rate of about 35 g/10 min tested at 230° C. according to ASTM 1238.

In multi-layer composites according to certain embodiments of the invention, the nonwoven fabric may have a basis weight from about 1 gsm to about 400 gsm. In other embodiments of the invention, the nonwoven fabric may have a basis weight from about 1 gsm to about 200 gsm. In further embodiments of the invention, the nonwoven fabric may have a basis weight from about 1 gsm to about 100 gsm. In some embodiments of the invention, the nonwoven fabric may have a basis weight of about 40 gsm.

In multi-layer composites according to certain embodiments of the invention, the plurality of segmented fibers may comprise about 0.1 wt % to about 10 wt % of an additive. In such embodiments of the invention, the additive may comprise at least one of a calcium carbonate additive, a titanium oxide additive, a $BaSO_4$ additive, a talc additive, a nanoclay additive, or any combination thereof. According to certain embodiments of the invention, the nanofiber fabric may further comprise at least one of a colorant, a fluorochemical, an antistatic agent, a hydrophilic agent, mineral fine particles, or any combination thereof.

In yet another aspect, certain embodiments of the invention provide a segmented fiber. The segmented fiber may include a fiber axis and a plurality of alternating larger diameter segments and smaller diameter segments along the fiber axis arranged in a coarse-fine-coarse-fine alternating pattern.

BRIEF DESCRIPTION OF THE DRAWING(S)

The invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout, and wherein.

DETAILED DESCRIPTION

Figure 1:
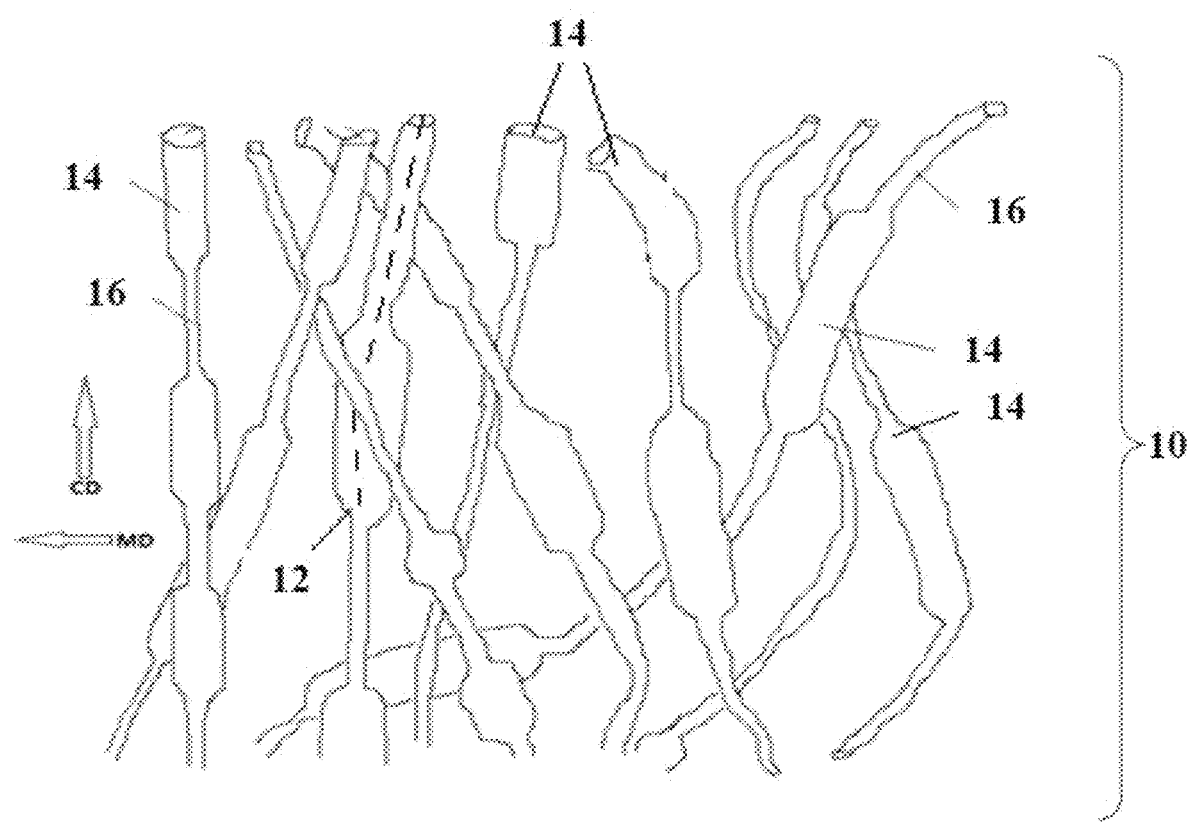
FIG. 1 illustrates a schematic view of a plurality of segmented fibers according to an embodiment of the invention.

The invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

The invention includes, according to certain embodiments, a nonwoven fabric comprising a plurality of segmented fibers. Each of the plurality of segmented fibers may comprise a fiber axis and a plurality of alternating larger diameter and smaller diameter segments along the fiber axis. The plurality of segmented fibers may be substantially aligned in a first direction. As such, the nonwoven fabric may be suitable for a wide variety of applications (e.g., healthcare, filtration, industrial, packaging, etc.).

I. Definitions

The terms "substantial" or "substantially" may encompass the whole amount as specified, according to certain embodiments of the invention, or largely but not the whole amount specified according to other embodiments of the invention.

The term "substantially aligned", as used herein, may generally refer to fibers that extend in a generally common direction with substantially increased orientation. It should be understood that portions of the fibers may bend, curl, twist and/or the like in a non-aligned manner and that such fibers may still be considered to be "substantially aligned" in accordance with certain embodiments of the invention. Accordingly, nonwoven fabrics formed from "substantially aligned" fibers differ from conventional nonwoven fabrics having randomly aligned, partially oriented fibers. In certain embodiments of the invention, at least about 55%, 70%, or 80% of the filaments may be oriented and/or aligned generally in a common direction and/or at least about 55%, 70%, or 80% of the linear length of at least a majority (e.g., 51%, 55%, 70%, 80%) of the filaments are oriented and/or aligned in a common direction. The term "substantially aligned" may, in accordance with certain embodiments of the invention, be defined by physical properties, such as cross-direction/machine-direction ratios of tensile strength and/or cross-direction/machine-direction ratios of elongation. Nonwoven fabrics comprising substantially aligned segmented fibers, according to certain embodiments of the invention, may comprise notably different cross-direction/machine-direction ratios of tensile strength and/or cross-direction/machine-direction ratios of elongation than, for example, traditional spunmelt nonwovens. For example, nonwoven fabrics comprising substantially aligned segmented fibers, according to certain embodiments of the invention, may comprise physical properties, such as cross-direction/machine-direction ratios of tensile strength and/or cross-direction/machine-direction ratios of elongation, which may be similar to carded bonded materials.

The terms "polymer" or "polymeric", as used interchangeably herein, may comprise homopolymers, copolymers, such as, for example, block, graft, random, and alternating copolymers, terpolymers, etc., and blends and modifications thereof. Furthermore, unless otherwise specifically limited, the term "polymer" or "polymeric" shall include all possible structural isomers; stereoisomers including, without limitation, geometric isomers, optical isomers or enantionmers; and/or any chiral molecular configuration of such polymer or polymeric material. These configurations include, but are not limited to, isotactic, syndiotactic, and atactic configurations of such polymer or polymeric material. The term "polymer" or "polymeric" shall also include polymers made from various catalyst systems including, without limitation, the Ziegler-Natta catalyst system and the metallocene/single-site catalyst system.

The terms "nonwoven" and "nonwoven web", as used herein, may comprise a web having a structure of individual fibers, filaments, and/or threads that are interlaid but not in an identifiable repeating manner as in a knitted or woven fabric. Nonwoven fabrics or webs, according to certain embodiments of the invention, may be formed by any process conventionally known in the art such as, for example, melt blowing processes, spunbonding processes, hydroentangling, air-laid, and carded bonded web processes.

The term "alternating", as used herein, may generally refer to a repeated interchanging of a plurality of larger diameter segments and smaller diameter segments. In some embodiments of the invention, however, "alternating" may refer to a segmented fiber having only one larger diameter segment and one smaller diameter segment.

The term "layer", as used herein, may comprise a generally recognizable combination of similar material types and/or functions existing in the X-Y plane.

The term "meltspun", as used herein, may comprise fibers which are formed by extruding molten thermoplastic material as filaments from a plurality of fine, usually circular, die capillaries of a spinneret and solidifying the extruded filaments by cooling them as they emerge from the die capillaries.

The term "spunbond", as used herein, may comprise fibers which are formed by extruding molten thermoplastic material as filaments from a plurality of fine, usually circular, capillaries of a spinneret with the diameter of the extruded filaments then being rapidly reduced. According to an embodiment of the invention, spunbond fibers are generally continuous and randomly deposited onto a collecting surface to form a web, which is subsequently bonded to achieve integrity. It is noted that the spunbond used in certain composites of the invention may include a nonwoven described in the literature as SPINLACE®.

The term "melt blown", as used herein, may comprise fibers formed by extruding a molten thermoplastic material through a plurality of fine die capillaries as molten threads or filaments into converging high velocity, usually hot, gas (e.g. air) streams which attenuate the filaments of molten thermoplastic material to reduce their diameter, which may be to microfiber diameter, according to certain embodiments of the invention. According to an embodiment of the invention, the die capillaries may be circular. Thereafter, the melt blown fibers are carried by the high velocity gas stream and are deposited on a collecting surface to form a web of randomly disbursed melt blown fibers. Melt blown fibers are microfibers which may be continuous or discontinuous and are generally self bonded when deposited onto a collecting surface.

The term "partially-drawn fibers", as used herein, may comprise fibers that are partially drawn and/or partially crystallized, and/or partially oriented, in which the fibers can be further drawn at a later time. In accordance with certain embodiments of the invention, "partially-drawn fibers" may be formed by a variety of processes (e.g., meltspun fibers). For instance, partially-drawn fibers may be formed according to a conventional melt blowing process, an electro-blowing process, a melt-film fibrillation process, an electro-spinning process, a solution spinning process, a meltspinning process, or a spunbonding process. In a spunbonding process, for example, the extruded filaments leaving the die are partially oriented by pneumatic acceleration speeds of up to about 6,000 m/min. In a melt blowing process, for example, the fibers may be attenuated rapidly by high velocity hot air stream(s), which leave the attenuated fibers with very little macromolecular orientation. Thus, most melt blown fibers may comprise "partially-drawn fibers" and/or "partially-oriented fibers". For instance, most melt blown fibers have very low macromolecular orientation, which is one of the reasons that melt blown fibers are generally very weak, for example, relative to spunbond fibers.

The term "hydroentangle", as used herein, may comprise a process for bonding a nonwoven fabric by using high pressure water jets to intermingle the fibers. Several rows of water jets are directed against the fiber web, which is supported by a movable fabric. Fiber entanglements are introduced by the combined effects of the water jets and the turbulent water created in the web, which intertwines neighboring fibers.

The term "composite", as used herein, may be a structure comprising two or more layers, such as a film layer and a fibrous layer. The two layers of a laminate structure may be joined together such that a substantial portion of their common X-Y plane interface, according to certain embodiments of the invention.

The term "extensible non-elastic filaments", as used herein, may generally refer to extensible filaments produced, for example, according to the S-TEX™ process from Polymer Group Inc., 9335 Harris Corners Parkway, Suite 300, Charlotte, N.C. 28269, USA. In the S-TEX™ process, a blend of olefin polymers is extruded in a spunbond process, and the filaments are drawn at a speed that is lower than that experienced in a typical spunbond process. This combination of low filament draw and formulation can produce filaments that can be formed into a bonded nonwoven and stretched substantially by an activation process without suffering significant filament breaks. As such, this process may produce a relatively strong nonwoven capable of high elongation.

The term "bicomponent fibers", as used herein, may comprise fibers formed from at least two different polymers extruded from separate extruders but spun together to form one fiber. Bicomponent fibers are also sometimes referred to as conjugate fibers or multicomponent fibers. The polymers are arranged in a substantially constant position in distinct zones across the cross-section of the bicomponent fibers and extend continuously along the length of the bicomponent fibers. The configuration of such a bicomponent fiber may be, for example, a sheath/core arrangement wherein one polymer is surrounded by another, or may be a side-by-side arrangement, a pie arrangement, or an "islands-in-the-sea" arrangement, each as is known in the art of multicomponent, including bicomponent, fibers. The "bicomponent fibers" may be thermoplastic fibers that comprise a core fiber made from one polymer that is encased within a thermoplastic sheath made from a different polymer or have a side-by-side arrangement of different thermoplastic fibers. The first polymer often melts at a different, typically lower, temperature than the second polymer. In the sheath/core arrangement, these bicomponent fibers provide thermal bonding due to melting of the sheath polymer, while retaining the desirable strength characteristics of the core polymer. In the side-by-side arrangement, the fibers shrink and crimp, creating z-direction expansion.

The term "film", as used herein, may comprise a polymeric or elastomeric layer or layers made using a film extrusion process, such as a cast film or blown film extrusion process. This term may also include films rendered microporous by mixing polymer and/or elastomer with filler, forming a film from the mixture, and optionally stretching the film.

II. Nonwoven Fabric

Certain embodiments according to the invention provide nonwoven fabrics suitable for a wide variety of applications (e.g., healthcare, filtration, industrial, packaging, etc.). In one aspect, the nonwoven fabric includes a plurality of segmented fibers. Each of the plurality of segmented fibers may comprise a fiber axis and a plurality of alternating larger diameter and smaller diameter segments along the fiber axis. The plurality of segmented fibers may be substantially aligned in a first direction.

In accordance with certain embodiments of the invention, for instance, each of the plurality of segmented fibers may be substantially continuous. In some embodiments of the invention, for example, the plurality of alternating larger diameter segments and smaller diameter segments may be arranged in a coarse-fine-coarse-fine alternating pattern.

FIG. 1, for example, illustrates a schematic view of a plurality of segmented fibers according to an embodiment of the invention. As shown in FIG. 1, each of the plurality of segmented fibers 10 include a fiber axis 12 and a plurality of alternating larger diameter segments 14 and smaller diameter segments 16 positioned along the fiber axis 12.

In accordance with certain embodiments of the invention, for instance, the nonwoven fabric may comprise a plurality of segmented fibers in which the segmented fibers comprise transition regions between the larger diameter segments and the smaller diameter segments. For example, a transition region may be located between a first larger diameter segment and an adjacent first smaller diameter segment. In such embodiments of the invention, for example, the transition region may comprise a shoulder or shoulder-like structure.

Figure 2:
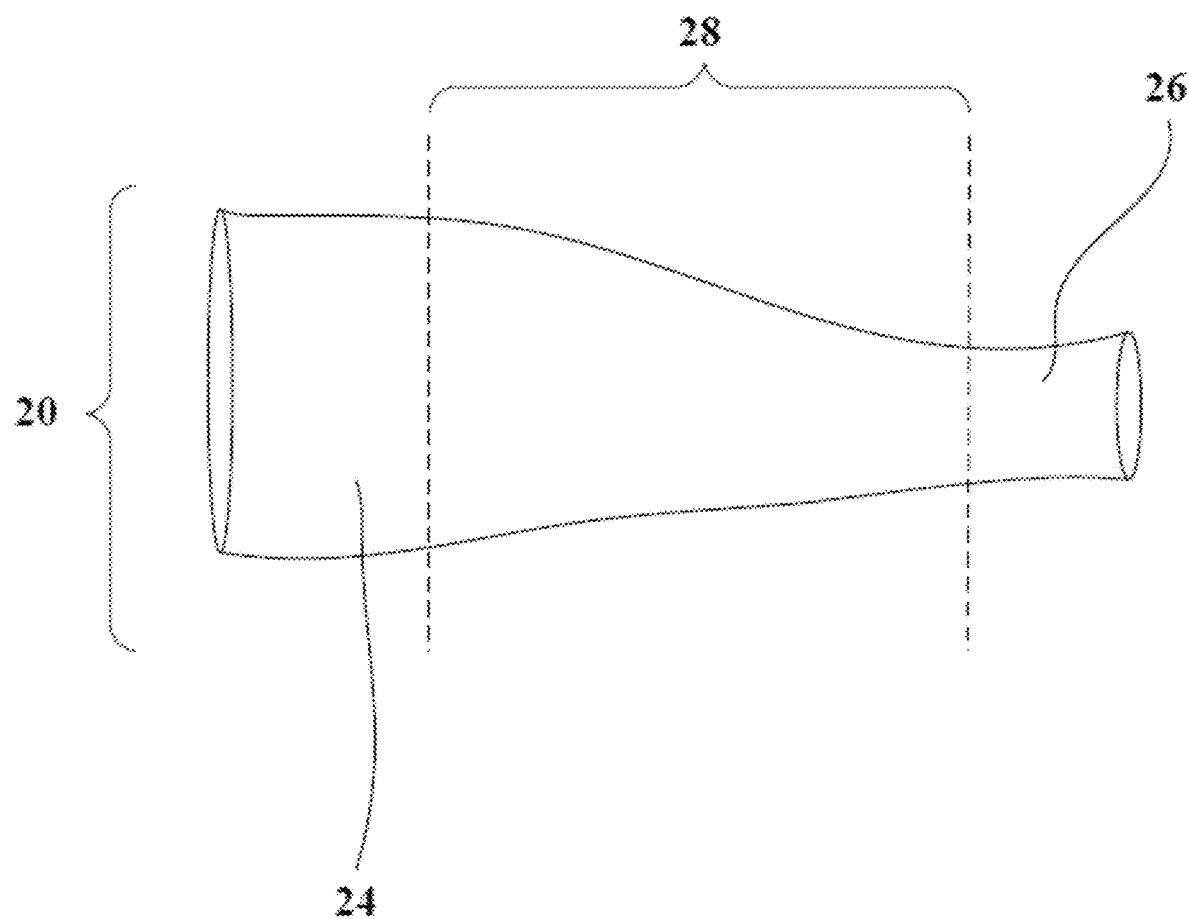
FIG. 2 illustrates a segmented fiber transition region according to an embodiment of the invention.

FIG. 2, for example, illustrates a transition region of a segmented fiber according to an embodiment of the invention. As shown in FIG. 2, the segmented fiber portion 20 includes a larger diameter segment 24 and a smaller diameter segment 26 that are connected by a transition region 28. In some embodiments of the invention, as illustrated in FIG. 2, the transition region 28 may be a sloped, gradual transition region 28 connecting the uniform larger diameter segment 24 to the uniform smaller diameter segment 26. In such embodiments in which the transition region comprises a sloped, gradual transition, the length of the transition region along the axis of the fiber may comprise from at least any of the following: 5, 8, 10 microns and/or at most about any of the following: 20, 15, and 12 microns. In accordance with certain embodiments of the invention, the transition region 28 may comprise a more sudden change in diameter, which may, for example, be akin to or comprise a shoulder-like structure. In accordance with certain embodiments of the invention, the transition region 28 comprises a first diameter adjacent the larger diameter segment 24 and a second diameter adjacent the smaller diameter segment 26, in which the first diameter is larger than the second diameter. The first diameter adjacent the larger diameter segment 24 of the transition region 28, in accordance with certain embodiments of the invention, may comprise a diameter from at least about any of the following: 10%, 20%, 30%, and 40% greater than the second diameter adjacent the smaller diameter segment 26 of the transition region 28 and/or at most about 500%, 400%, 300%, 200%, 150%, 100%, 75%, and 50% μm greater than the second diameter adjacent the smaller diameter segment 26 of the transition region 28. (e.g., first diameter about 40-150%, about 75%-100% greater than the second diameter).

Figure 3:
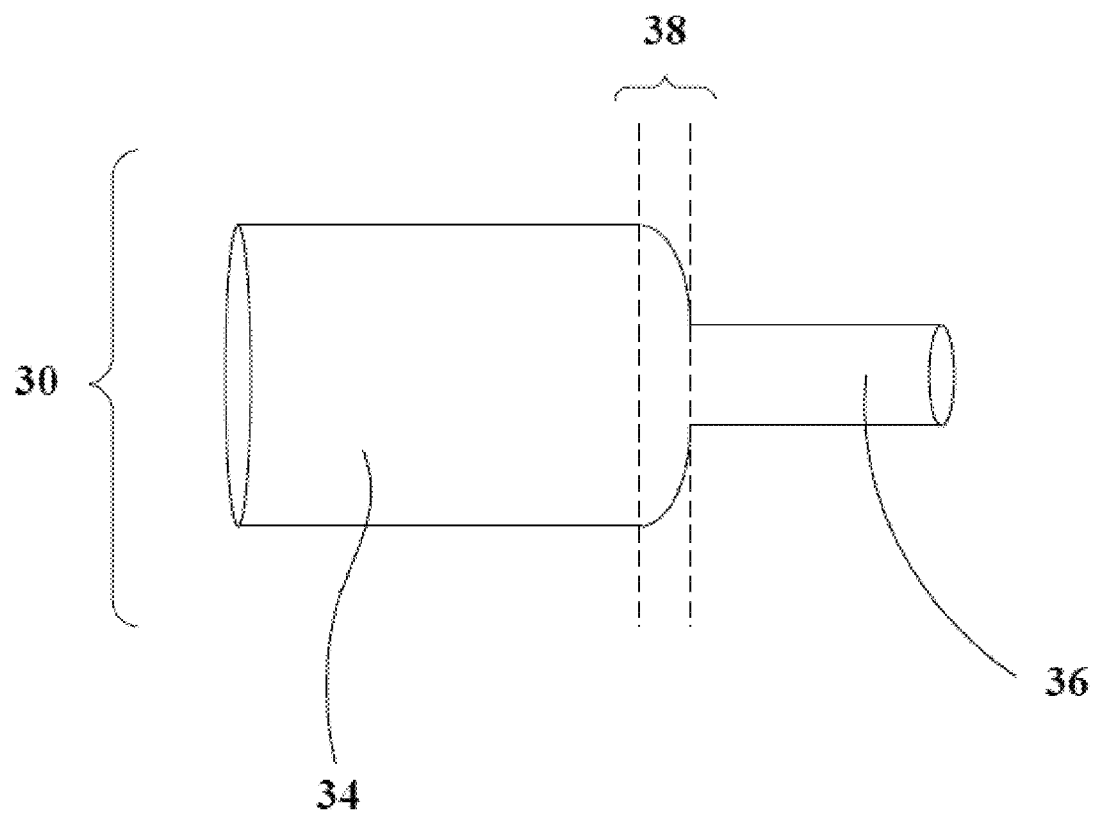
FIG. 3 illustrates a segmented fiber transition region according to an embodiment of the invention.

FIG. 3, for example, illustrates a transition region of a segmented fiber according to an embodiment of the invention. As shown in FIG. 3, the segmented fiber portion 30 includes a larger diameter segment 34 and a smaller diameter segment 36 that are connected by transition region 38. In some embodiments of the invention, as illustrated in FIG. 3, the transition region 38 may be a shoulder or shoulder-like structure, in which the transition from the larger diameter segment 34 to the smaller diameter segment 36 is more abrupt. In such embodiments in which the transition region comprises a shoulder or shoulder-like structure, the length of the transition region along the axis of the fiber may comprise from at least any of the following: 0.5, 1, and 2 microns and/or at most about any of the following: 5, 4, 3, and 2 microns. In accordance with certain embodiments of the invention, the transition region 38 comprises a first diameter adjacent the larger diameter segment 34 and a second diameter adjacent the smaller diameter segment 36, in which the first diameter is larger than the second diameter. The first diameter adjacent the larger diameter segment 34 of the transition region 38, in accordance with certain embodiments of the invention, may comprise a diameter from at least about any of the following: 10%, 20%, 30%, and 40% greater than the second diameter adjacent the smaller diameter segment 36 of the transition region 38 and/or at most about 500%, 400%, 300%, 200%, 150%, 100%, 75%, and 50% μm greater than the second diameter adjacent the smaller diameter segment 36 of the transition region 38. (e.g., first diameter about 40-150%, about 75%-100% greater than the second diameter).

In accordance with certain embodiments of the invention, a segmented fiber as disclosed herein may comprise transition regions of varying length between adjacent larger diameter segments and smaller diameter segments. For example, the transition region between a first larger diameter segment and an adjacent smaller diameter segment may comprise a length associated with a shoulder-like structure (e.g., 0.5-2 microns), while a second transition region located between a second larger diameter segment and an adjacent smaller diameter segment may comprise a length associated with a sloped, gradual transition (e.g., 5-12 microns). In certain embodiments of the invention, a single larger diameter segment may be positioned between two transitions regions, in which the two transition regions comprise the same or different length.

In accordance with certain embodiments of the invention the plurality of segmented fibers may be substantially aligned in a first direction. In certain embodiments of the invention, for instance, the first direction may comprise a cross direction. In some embodiments of the invention, for example, the plurality of segmented fibers may comprise a machine direction elongation and a cross direction elongation, and the machine direction elongation may be greater than the cross direction elongation. In such embodiments of the invention, for instance, the machine direction elongation at break may be at least 3 times longer than the cross direction (e.g., the direction in which the plurality of segmented fibers are aligned) elongation at break (e.g., at least 3.5, 4, 4.5, 5, 6, 7 or 8 times longer than the cross direction elongation at break). In further embodiments of the invention, for example, the plurality of segmented fibers may comprise a cross direction tensile strength and a machine direction tensile strength, and the cross direction tensile strength may be at least 2 times stronger than the machine direction tensile strength, for example, at 50% elongation or at break. In accordance with certain embodiments of the invention, the direction in which the plurality of segmented fibers have been substantially aligned, such as the cross direction, may comprise a tensile strength at least 2 times stronger (e.g., at least about 2.5, 3, 4, or 5 times stronger) than the perpendicular direction (e.g., machine direction) tensile strength, for example, at 50% elongation or at break.

In accordance with certain embodiments of the invention, for instance, at least one of the larger diameter segments may have a diameter from about 1 µm to about 100 µm, and at least one of the smaller diameter segments may have a diameter from about 0.5 µm to about 25 µm. In other embodiments of the invention, for example, at least one of the larger diameter segments may have a diameter from about 1.5 µm to about 50 µm, and at least one of the smaller diameter segments may have a diameter from about 0.75 µm to about 20 µm. In further embodiments of the invention, for instance, at least one of the larger diameter segments may have a diameter from about 2 µm to about 25 µm, and at least one of the smaller diameter segments may have a diameter from about 1 µm to about 18 µm. As such, in certain embodiments of the invention, at least one of the larger diameter segments may have a diameter from at least about any of the following: 1, 1.25, 1.5, 1.75, and 2 µm and/or at most about 100, 75, 50, 40, and 25 µm (e.g., about 1.5-50 µm, about 2-100 µm, etc.). In further embodiments of the invention, at least one of the smaller diameter segments may have a diameter from at least about any of the following: 0.5, 0.6, 0.75, 0.9, and 1 µm and/or at most about 25, 23, 20, 19, and 18 µm (e.g., about 0.75-23 µm, about 0.9-25 µm, etc.).

According to certain embodiments of the invention, for example, the plurality of segmented fibers may have an average fiber diameter from about 0.1 µm to about 100 µm. In other embodiments of the invention, for instance, the plurality of segmented fibers may have an average fiber diameter from about 0.5 µm to about 50 µm. In further embodiments of the invention, for example, the plurality of segmented fibers may have an average fiber diameter from about 1 µm to about 25 µm. As such, in certain embodiments of the invention, the plurality of segmented fibers may have an average fiber diameter from at least about any of the following: 0.1, 0.25, 0.5, 0.75, and 1 µm and/or at most about 100, 75, 50, 30, and 25 µm (e.g., about 0.5-50 µm, about 1-75 µm, etc.).

In accordance with certain embodiments of the invention, for instance, the plurality of alternating larger diameter segments and smaller diameter segments may have a fiber diameter change $\Delta d_f$ between a first larger diameter segment and a first smaller diameter segment calculated by Equation 1:

$$\Delta d_f = \frac{d_{f,l} - d_{f,s}}{d_{f,l}} \times 100 \tag{1}$$

where $d_{f,l}$ is the fiber diameter of the larger diameter segment and $d_{f,s}$ is the fiber diameter of the smaller diameter segment. In such embodiments of the invention, for example, the fiber diameter change $\Delta d_f$ may comprise from about 5% to about 60%. In other embodiments of the invention, for instance, the fiber diameter change $\Delta d_f$ may comprise from about 20% to about 50%. In further embodiments of the invention, for example, the fiber diameter change $\Delta d_f$ may comprise from about 30% to about 40%. As such, in certain embodiments of the invention, the fiber diameter change $\Delta d_f$ may comprise from at least about any of the following: 3, 4, 5, 12, 20, 25, and 30% and/or at most about 75, 70, 65, 60, 55, 50, 45, 40 and 35% (e.g., about 12-55%, about 25-45%, etc.). According to certain embodiments of the invention, for instance, at least one of the larger diameter segments may have a diameter that is at least 6% larger than at least one of the smaller diameter segments. In some embodiments of the invention, for example, at least one of the larger diameter segments may have a diameter that is at least 10% larger than at least one of the smaller diameter segments.

In accordance with certain embodiments, the one or more of the plurality of segmented fibers may comprise one or more discrete large diameter segments separated by smaller diameter segments per linear meter of the segmented fiber. In certain embodiments of the invention, for example, a linear meter of the segmented fiber may comprise from at least about any of the following: 1, 2, 3, 5, 10, and 15 discrete large diameter segments separated by smaller diameter segments and/or at most about 50, 40, 30, 25, and 20 discrete large diameter segments separated by smaller diameter segments (e.g., about 2-50, about 1-10, etc.).

In accordance with certain embodiments of the invention, for instance, the plurality of segmented fibers may comprise meltspun fibers. In certain embodiments of the invention, for example, the plurality of segmented fibers may comprise melt blown fibers. In further embodiments of the invention, for instance, the plurality of segmented fibers may comprise spunbond fibers. In certain embodiments of the invention, for example, the plurality of segmented fibers may comprise extensible non-elastic filaments. In some embodiments of the invention, for instance, the plurality of segmented fibers may comprise multicomponent fibers. In such embodiments of the invention, for example, the plurality of segmented fibers may comprise sheath/core bicomponent fibers. In other embodiments of the invention, for instance, the plurality of segmented fibers may comprise side-by-side bicomponent fibers. According to certain embodiments of the invention, for example, the plurality of segmented fibers may comprise at least one of a polypropylene, a polyethylene, a propylene-ethylene random copolymer, a propylene-ethylene block copolymer, a polyethylene terephthalate, a polybutylene terephthalate, a polytrimethylene terephthalate, a polylactic acid, a polyamide, or any combination thereof. In some embodiments of the invention, for instance, the plurality of segmented fibers may comprise a polypropylene. In such embodiments of the invention, for example, the polypropylene may have a melt flow rate from about 10 g/10 min to about 2000 g/10 min at 230° C. tested at 230° C. according to ASTM 1238 and 2.16 kg. In other embodiments of the invention, for instance, the polypropylene may have a melt flow rate from about 20 g/10 min to about 500 g/10 min at 230° C. tested at 230° C. according to ASTM 1238 and 2.16 kg. In further embodiments of the invention, for example, the polypropylene may have a melt flow rate from about 25 g/10 min to about 100 g/10 min at 230° C. tested at 230° C. according to ASTM 1238 and 2.16 kg. In some embodiments of the invention, for instance, the polypropylene may have a melt flow rate of about 35 g/10 min at 230° C. tested at 230° C. according to ASTM 1238 and 2.16 kg. As such, in certain embodiments of the invention, the polypropylene may have a melt flow rate at 230° C. tested at 230° C. according to ASTM 1238 and 2.16 kg from at least about any of the following: 5, 10, 15, 20, 25, 30, and 35 g/10 min tested at 230° C. according to ASTM 1238 and/or at most about 2000, 1000, 500, 250, 100, and 35 g/10 min tested at 230° C. according to ASTM 1238 (e.g., about 30-2000 g/10 min tested at 230° C. according to ASTM 1238, about 10-40 g/10 min tested at 230° C. according to ASTM 1238, etc.).

In further embodiments of the invention, for example, the nonwoven fabric may be a polyethylene-based nonwoven. In such embodiments of the invention, for instance, the nonwoven fabric may provide improved house wrap, packaging, gamma-stable healthcare products and/or the like.

In accordance with certain embodiments of the invention, for example, the nonwoven fabric may have a basis weight from about 1 gsm to about 400 gsm. In other embodiments of the invention, for instance, the nonwoven fabric may have a basis weight from about 1 gsm to about 200 gsm. In further embodiments of the invention, for example, the nonwoven fabric may have a basis weight from about 1 gsm to about 100 gsm. In some embodiments of the invention, for instance, the nonwoven fabric may have a basis weight of about 40 gsm. As such, in certain embodiments of the invention, the nonwoven fabric may have a basis weight from at least about any of the following: 1, 10, 20, 30, and 40 gsm and/or at most about 400, 300, 200, 100, and 40 gsm (e.g., about 30-400 gsm, about 1-300 gsm, etc.).

In accordance with certain embodiments of the invention, for example, the plurality of segmented fibers may comprise about 0.1 wt % to about 10 wt % of an additive. In such embodiments of the invention, for instance, the additive may comprise at least one of a calcium carbonate additive, a titanium oxide additive, a $BaSO_4$ additive, a talc additive, a nanoclay additive, or any combination thereof. According to certain embodiments of the invention, for example, the nanofiber fabric may further comprise at least one of a colorant, a fluorochemical, an antistatic agent, a hydrophilic agent, mineral fine particles, or any combination thereof.

As such, according to certain embodiments of the invention, for instance, the nonwoven fabric may comprise a plurality of substantially aligned, segmented fibers having substantially increased orientation over conventional nonwovens. In some embodiments of the invention, for example, webs of the aligned fibers may be overlapped in order to provide a balance between the cross direction and the machine direction in order to provide improved coverage and bonding/sealing characteristics.

Figure 4:
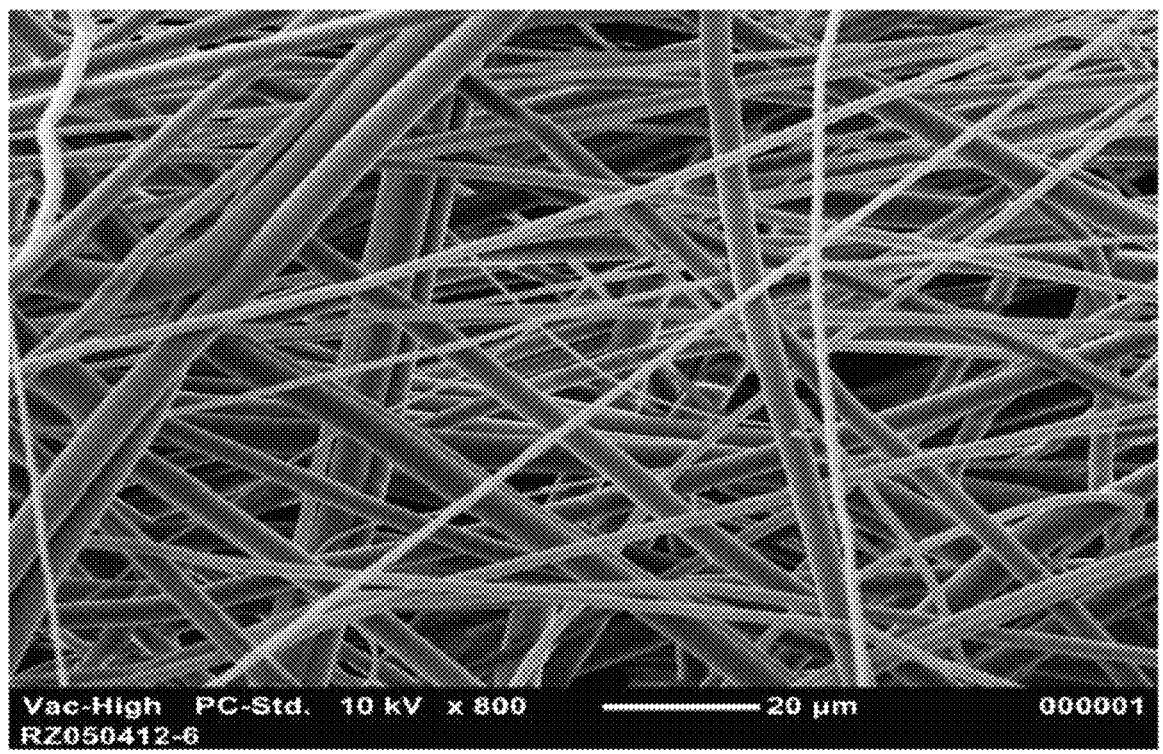
FIG. 4 is a scanning electron microscope (SEM) image of melt blown fibers according to the prior art.

FIG. 4, for example, is a scanning electron microscope (SEM) image of melt blown fibers according to the prior art. As shown in FIG. 4, the prior art melt blown fibers are randomly aligned and only partially oriented. Additionally, none of the prior art melt blown fibers include a transition region.

Figure 5:
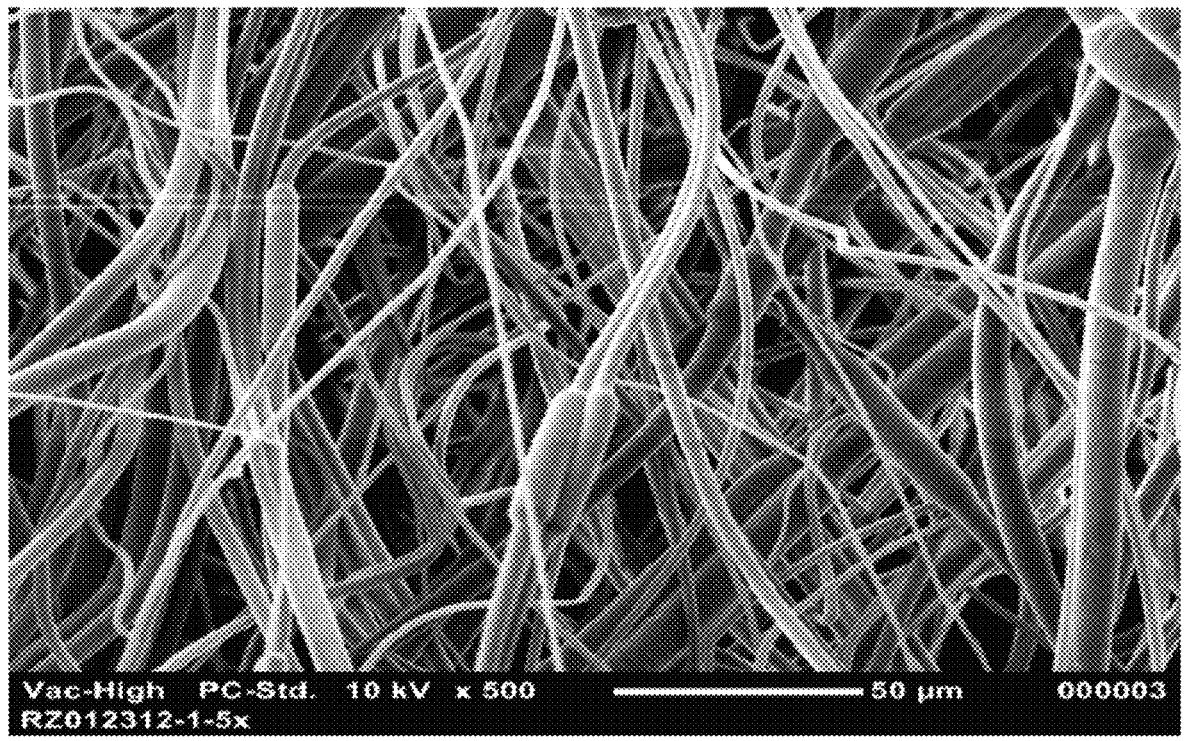
FIG. 5 is an SEM image of segmented fibers after being stretched according to an embodiment of the invention.

FIG. 5, for example, is an SEM image of segmented fibers after being stretched according to an embodiment of the invention. As shown in FIG. 5, the segmented fibers include shoulder transition regions after being stretched, are substantially aligned, and have substantially increased orientation over prior art melt blown fibers.

Figure 6:
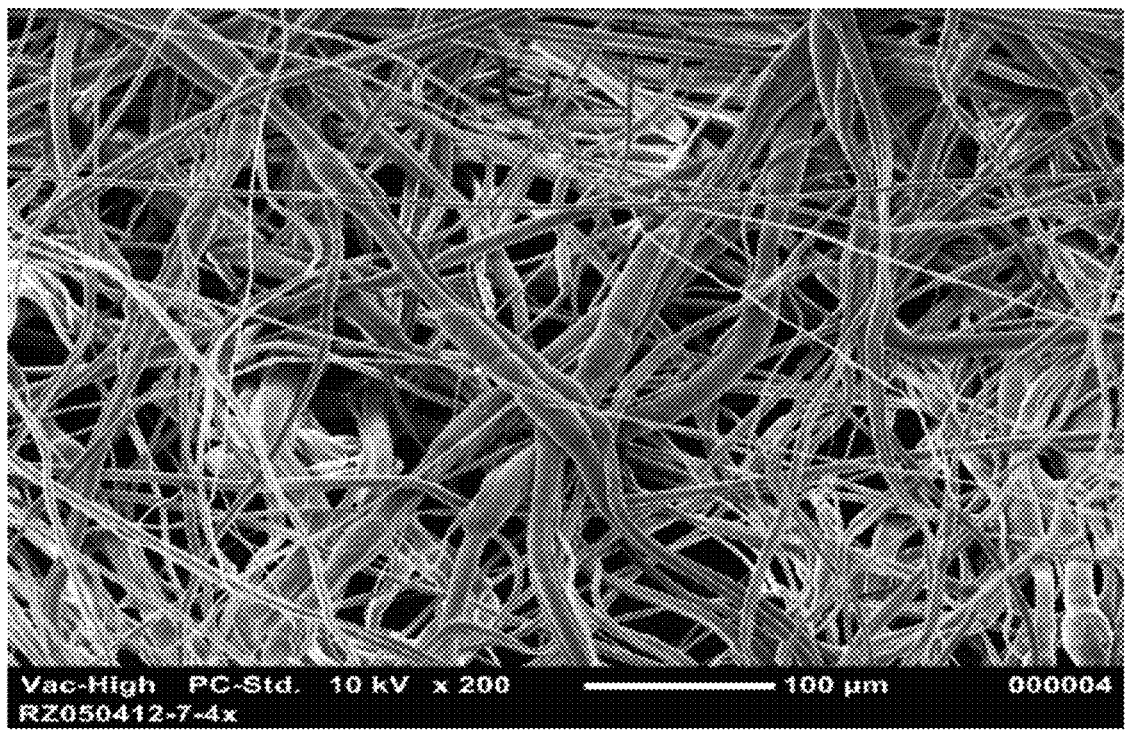
FIG. 6 is an SEM image of segmented fibers after being stretched according to an embodiment of the invention.

FIG. 6, for example, is an SEM image of segmented fibers after being stretched according to an embodiment of the invention. As shown in FIG. 6, the segmented fibers include gradually sloping transition regions after being stretched, are substantially aligned, and have substantially increased orientation over prior art melt blown fibers.

Figure 7:
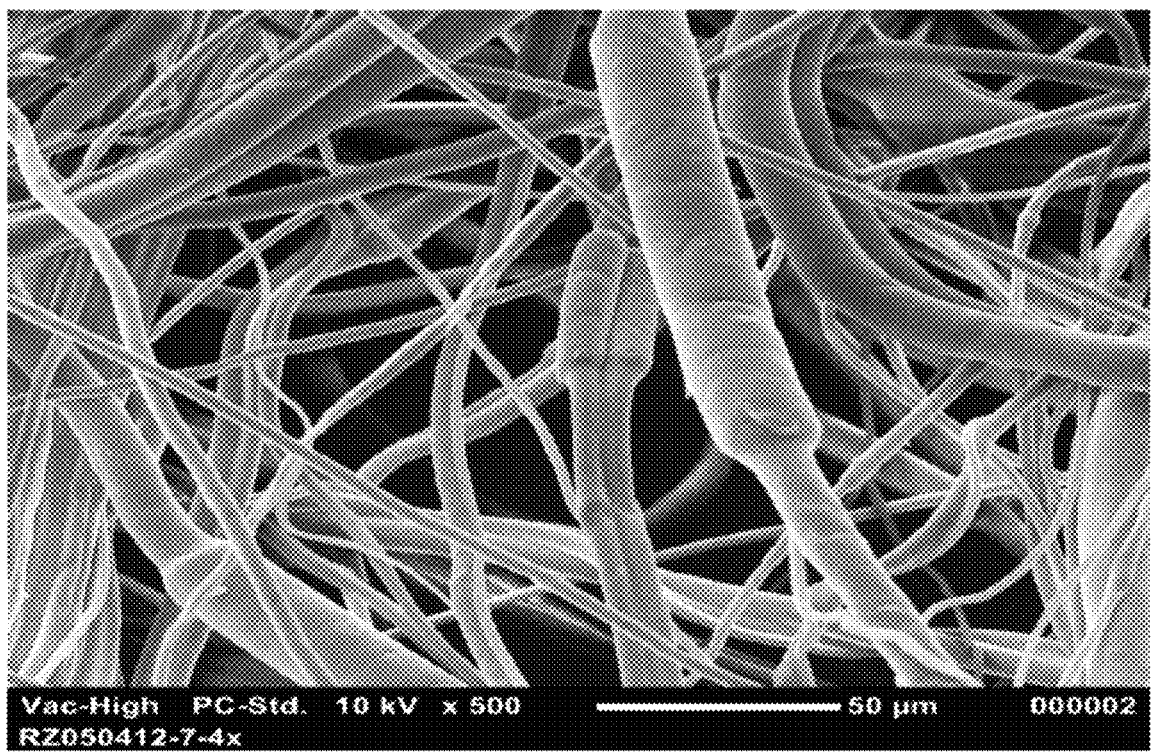
FIG. 7 is an SEM image of segmented fibers after being stretched according to an embodiment of the invention.

FIG. 7, for example, is an SEM image of segmented fibers after being stretched according to an embodiment of the invention. As shown in FIG. 7, the segmented fibers include shoulder transition regions after being stretched, are substantially aligned, and have substantially increased orientation over prior art melt blown fibers.

III. Methods of Forming a Nonwoven Fabric

In another aspect, certain embodiments of the invention provide a process for forming a nonwoven fabric. The process includes forming a nonwoven web of fibers, such as partially-drawn fibers, stretching the nonwoven web at least twice in a first direction to form a plurality of segmented fibers in accordance with certain embodiments of the invention disclosed herein, and bonding the plurality of segmented fibers. Each of the plurality of segmented fibers may comprise a fiber axis and a plurality of alternating segments of substantially different fiber diameters along the fiber axis. The plurality of segmented fibers may be substantially aligned in the first direction.

Figure 8:
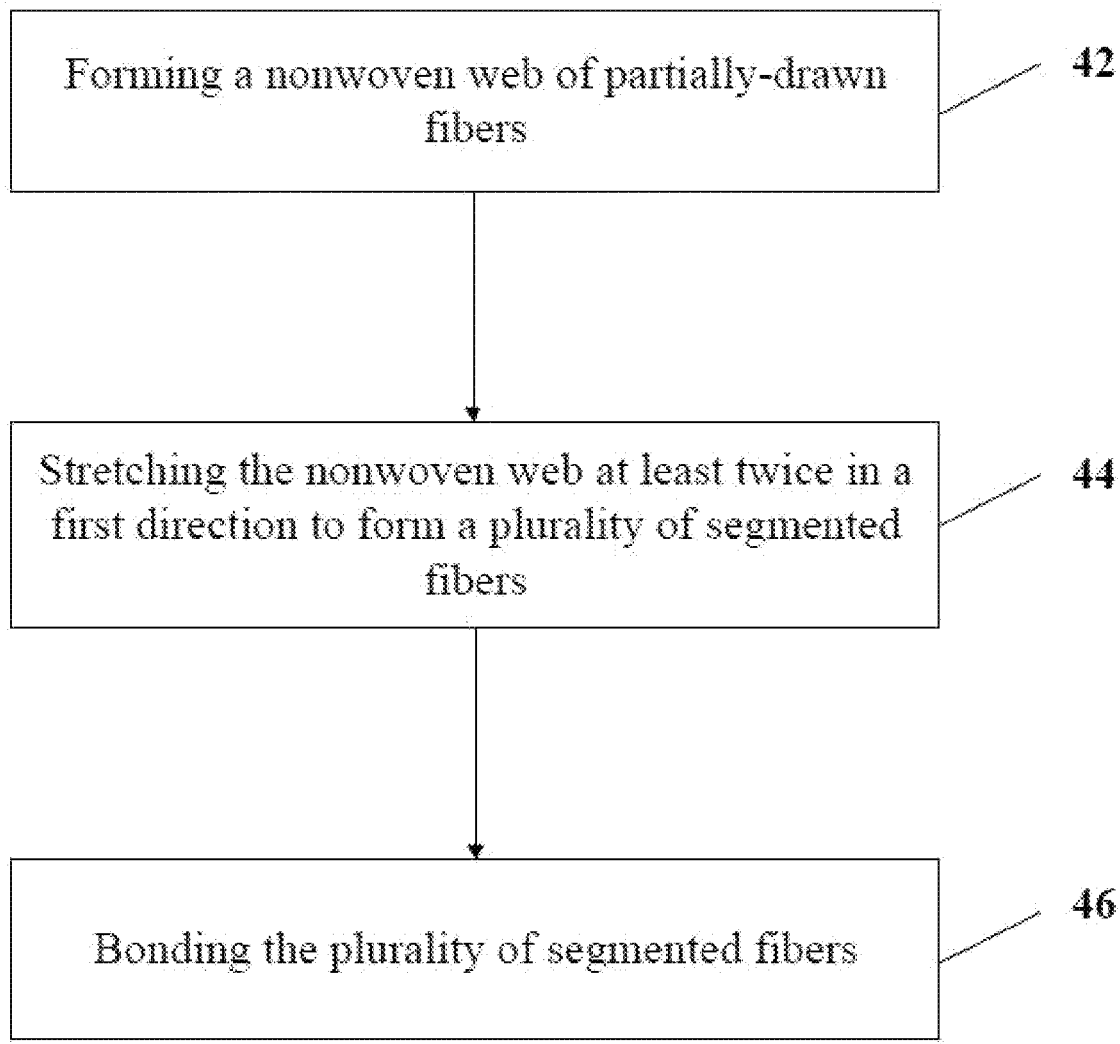
FIG. 8 illustrates a process flow diagram for forming a nonwoven fabric according to an embodiment of the invention.

FIG. 8, for example, illustrates a process flow diagram for forming a nonwoven fabric according to an embodiment of the invention. As shown in FIG. 8, the process includes forming a nonwoven web of, for example, partially-drawn fibers at operation 42. The process further includes stretching the nonwoven web at least twice in a first direction to form a plurality of segmented fibers at operation 44 and bonding the plurality of segmented fibers at operation 46.

In accordance with certain embodiments of the invention, for instance, forming the nonwoven web of partially-drawn fibers may comprise performing at least one of a melt blowing process, an electro-blowing process, a melt-film fibrillation process, an electrospinning process, a solution spinning process, a meltspinning process, a spunbonding process, or any combination thereof. In some embodiments of the invention, for example, forming the nonwoven web of partially-drawn fibers may comprise a melt blowing process.

According to certain embodiments of the invention, for instance, stretching (e.g., ring rolling) the nonwoven web to form a plurality of segmented fibers may comprise feeding the nonwoven web of partially-drawn fibers through a first stretching station to incrementally stretch the nonwoven sheet in the first direction, spreading the nonwoven web in the first direction, and feeding the stretched and spread nonwoven web through a second stretching station to further incrementally stretch the nonwoven web in the first direction. In some embodiments of the invention, for example, the first stretching station may have a first incremental stretching distance, the second stretching station may have a second incremental stretching distance, and the second incremental stretching distance may be less than or equal to the first incremental stretching distance. In such embodiments of the invention, for instance, the plurality of segmented fibers may be substantially aligned in the first direction after stretching at least 3 (e.g., at least 4 times, 5 times, 6 times, etc.) times in the first direction. In further embodiments of the invention, for example, the plurality of segmented fibers may be substantially aligned in the first direction after stretching 4 times in the first direction. In some embodiments of the invention, for instance, one stretching station may be used such that the nonwoven web is repeatedly fed through the single stretching station. As such, according to certain embodiments of the invention, the process may comprise repeatedly stretching a conventional nonwoven web having randomly aligned, partially oriented fibers to form a nonwoven fabric having substantially aligned fibers in a direction having substantially increased orientation.

Figure 9A:
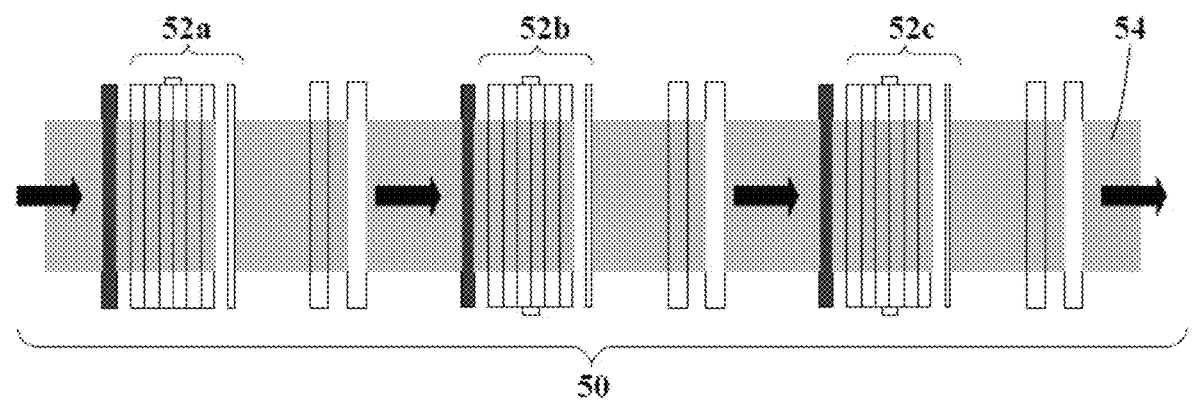
FIGS. 9A and 9B illustrate a set of pairs of interdigitating rollers having grooves parallel to the axis of the rollers according to an embodiment of the invention.
Figure 9B:
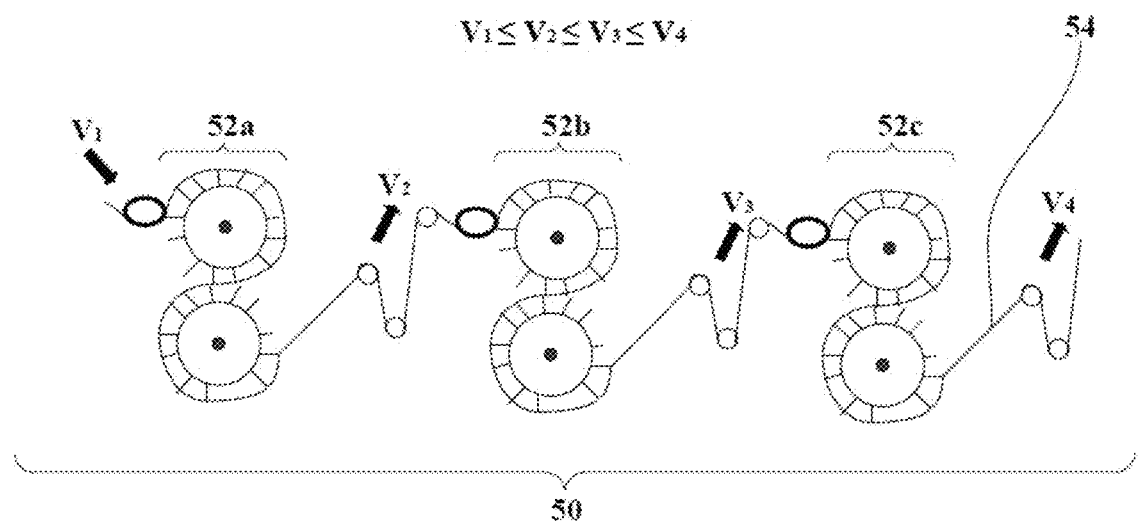

FIGS. 9A and 9B, for example, illustrate a set of pairs of interdigitating rollers having grooves parallel to the axis of the rollers according to an embodiment of the invention. As shown in FIGS. 9A and 9B, the set of rollers 50 includes a first machine direction (MD) stretching station having an interdigitating roller pair 52a, a second MD stretching station having an interdigitating roller pair 52b, and a third MD stretching station having an interdigitating roller pair 52c, each of which has grooves running parallel to the axis of the MD stretching station roller pairs 52a, 52b, and 52c. As such, a nonwoven web 54 proceeds through the set of rollers 50 to stretch the nonwoven web 54 repeatedly in one direction in multiple passes.

In such embodiments of the invention, for example, the nonwoven web 54 may enter a nip between a grooved roller and a pressure roller of a MD stretching station 52a at a first speed V1 and then enter a nip between the pair of interdigitating rollers. The nonwoven web may then be stretched and, as a result, have a higher second speed V2. Before the nonwoven web 54 enters the next MD stretching station 52b, it may move through a set of dancer rolls to manage web tension. The pressure roller may maintain the nonwoven web 54 in a position to prevent slippage. As the nonwoven web 54 enters into other MD stretching stations (e.g., 52c), it may be further stretched in the MD direction such that its speed increases and its basis weight decreases. As shown in FIG. 9B, for example, the linear speed (e.g., V1, V2, V3, V4, etc.) of the nonwoven web 54 may increase after passing through each of the stretching stations (e.g., 52a, 52b, 52c, etc.)

Figure 10A:
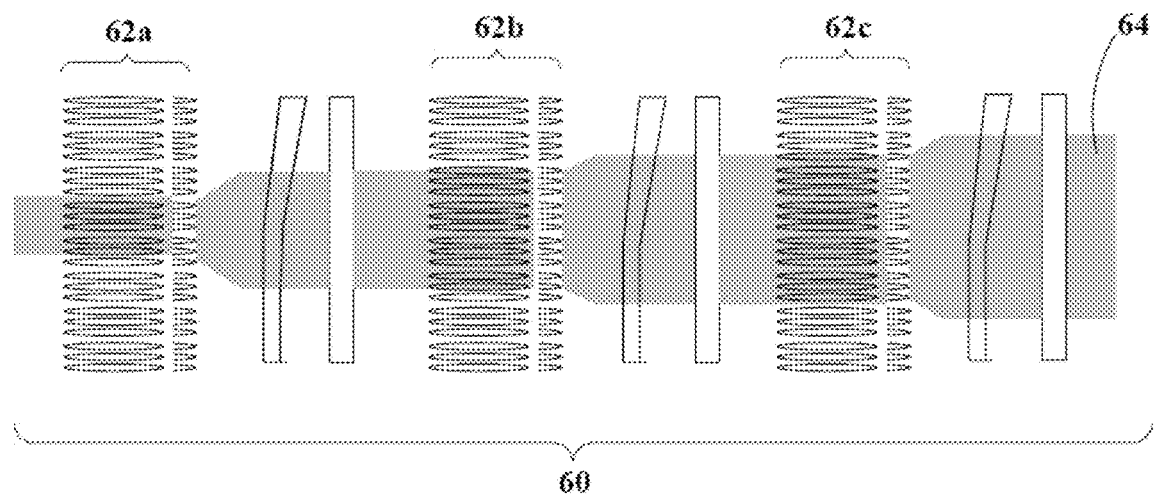
FIGS. 10A and 10B illustrate a set of pairs of interdigitating rollers having grooves perpendicular to the axis of the rollers according to an embodiment of the invention.
Figure 10B:
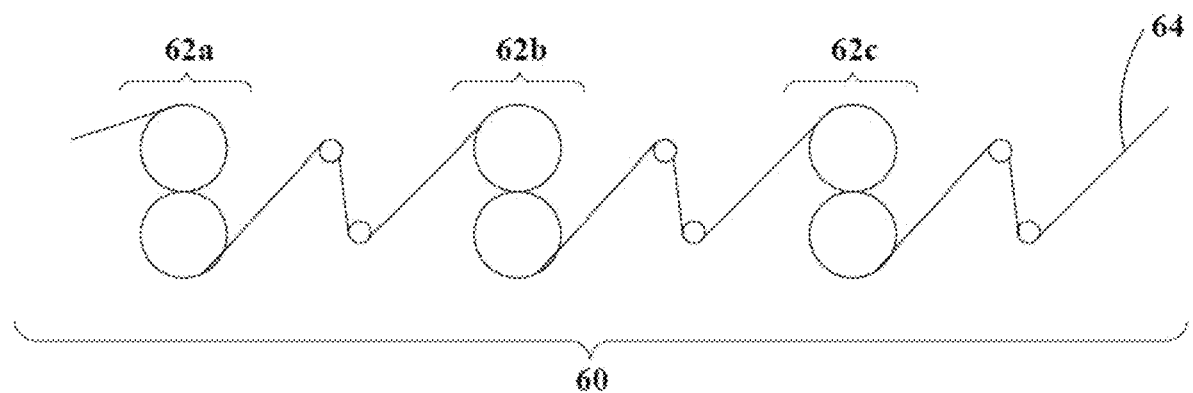

FIGS. 10A and 10B, for example, illustrate a set of pairs of interdigitating rollers having grooves perpendicular to the axis of the rollers according to an embodiment of the invention. As shown in FIGS. 10A and 10B, the set of rollers 60 includes a first cross direction (CD) stretching station having an interdigitating roller pair 62a, a second CD stretching station having an interdigitating roller pair 62b, and a third CD stretching station having an interdigitating roller pair 62c, each of which has grooves running perpendicular to the axis of the CD stretching station roller pairs 62a, 62b, and 62c. As such, a nonwoven web 64 proceeds through the set of rollers 60 to stretch the nonwoven web 64 repeatedly in one direction in multiple passes.

In such embodiments of the invention, for instance, the nonwoven web 64 may enter a nip between two grooved rollers of a CD stretching station, e.g., 62a, and be stretched in the CD direction. The nonwoven web 64 may then be spread by a spreader roll. Additional spreader rolls and idlers may be used to improve web spreading and stretching efficiency in the next CD stretching station, e.g., 62b. As the nonwoven web 64 proceeds through the stretching stations, its basis weight may decrease.

Figure 11:
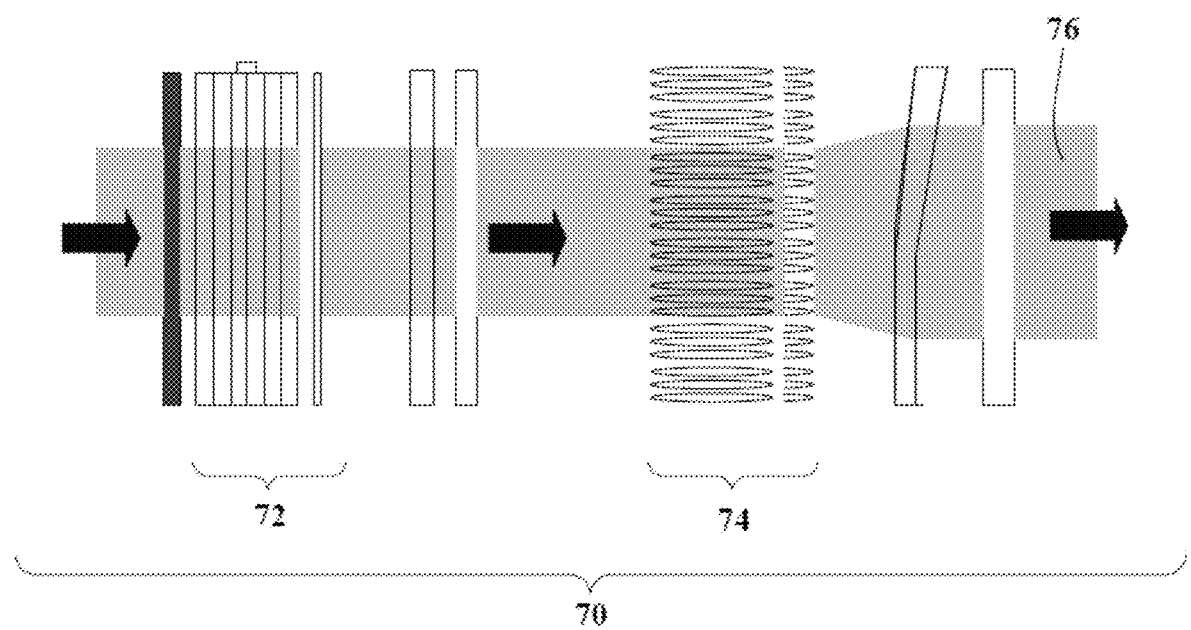
FIG. 11 illustrates a pair of interdigitating rollers having grooves parallel to the axis of the rollers followed by a pair of interdigitating rollers having grooves perpendicular to the axis of the rollers according to the prior art.

FIG. 11, for example, illustrates a pair of interdigitating rollers having grooves parallel to the axis of the rollers followed by a pair of interdigitating rollers having grooves perpendicular to the axis of the rollers according to the prior art. As shown in FIG. 11, the set of rollers 70 includes a pair of interdigitating rollers having grooves parallel to the roller axis 72 and a pair of interdigitating rollers having grooves perpendicular to the roller axis 74. As such, a nonwoven web 76 proceeds through the set of rollers 70 to stretch the nonwoven web 76 in both the machine direction and the cross direction.

According to certain embodiments of the invention, for example, methods of forming nonwoven fabrics may comprise bonding at least a portion of the plurality of segmented fibers. In certain embodiments of the invention, the step of bonding the plurality of segmented fibers may comprise bonding at a multiplicity of bonding sites. In some embodiments of the invention, for instance, bonding the plurality of segmented fibers may comprise performing at least one of thermal calendering, ultrasonic bonding, hydroentangling, needle punching, chemical resin bonding, stitch bonding, or any combination thereof.

In accordance with certain embodiments of the invention, for example, at least one or each of the plurality of segmented fibers may be substantially continuous. In some embodiments of the invention, for instance, the plurality of alternating larger diameter segments and smaller diameter segments may be arranged in a coarse-fine-coarse-fine alternating pattern.

In accordance with certain embodiments of the invention, for example, the first direction may comprise a cross direction. In some embodiments of the invention, for instance, the plurality of segmented fibers may comprise a machine direction elongation and a cross direction elongation, and the machine direction elongation may be greater than the cross direction elongation. In such embodiments of the invention, for example, the machine direction elongation at break may be at least 3 times longer than the cross direction elongation at break. In further embodiments of the invention, for instance, the plurality of segmented fibers may comprise a cross direction tensile strength and a machine direction tensile strength, and the cross direction tensile strength may be at least 2 times stronger than the machine direction tensile strength, for example, at 50% elongation or at break as previously discussed.

In accordance with certain embodiments of the invention, for example, at least one of the larger diameter segments may have a diameter from about 1 μm to about 100 μm, and at least one of the smaller diameter segments may have a diameter from about 0.5 μm to about 25 μm. In other embodiments of the invention, for instance, at least one of the larger diameter segments may have a diameter from about 1.5 μm to about 50 μm, and at least one of the smaller diameter segments may have a diameter from about 0.75 μm to about 20 μm. In further embodiments of the invention, for example, at least one of the larger diameter segments may have a diameter from about 2 μm to about 25 μm, and at least one of the smaller diameter segments may have a diameter from about 1 μm to about 18 μm. As such, in certain embodiments of the invention, at least one of the larger diameter segments may have a diameter from at least about any of the following: 1, 1.25, 1.5, 1.75, and 2 μm and/or at most about 100, 75, 50, 40, and 25 μm (e.g., about 1.5-50 μm, about 2-100 μm, etc.). In further embodiments of the invention, at least one of the smaller diameter segments may have a diameter from at least about any of the following: 0.5, 0.6, 0.75, 0.9, and 1 μm and/or at most about 25, 23, 20, 19, and 18 μm (e.g., about 0.75-23 μm, about 0.9-25 μm, etc.).

According to certain embodiments of the invention, for instance, the plurality of segmented fibers may have an average fiber diameter from about 0.1 μm to about 100 μm. In other embodiments of the invention, for example, the plurality of segmented fibers may have an average fiber diameter from about 0.5 µm to about 50 µm. In further embodiments of the invention, for instance, the plurality of segmented fibers may have an average fiber diameter from about 1 µm to about 25 µm. As such, in certain embodiments of the invention, the plurality of segmented fibers may have an average fiber diameter from at least about any of the following: 0.1, 0.25, 0.5, 0.75, and 1 µm and/or at most about 100, 75, 50, 30, and 25 µm (e.g., about 0.5-50 pm, about 1-75 µm, etc.).

In accordance with certain embodiments of the invention, for example, the plurality of alternating larger diameter segments and smaller diameter segments may have a fiber diameter change $\Delta d_f$ (as previously defined and discussed herein) between a first larger diameter segment and a first smaller diameter segment calculated according to Equation 1, and the fiber diameter change $\Delta d_f$ may comprise from about 5% to about 60%. In other embodiments of the invention, for instance, the fiber diameter change $\Delta d_f$ may comprise from about 20% to about 50%. In further embodiments of the invention, for example, the fiber diameter change $\Delta d_f$ may comprise from about 30% to about 40%. As such, in certain embodiments of the invention, the fiber diameter change $\Delta d_f$ may comprise from at least about any of the following: 3, 4, 5, 12, 20, 25, and 30% and/or at most about 75, 70, 65, 60, 55, 50, 45, 40 and 35% (e.g., about 12-55%, about 25-45%, etc.). According to certain embodiments of the invention, for instance, at least one of the larger diameter segments may have a diameter that is at least 6% larger than at least one of the smaller diameter segments. In some embodiments of the invention, for example, at least one of the larger diameter segments may have a diameter that is at least 10% larger than at least one of the smaller diameter segments.

In accordance with certain embodiments of the invention, for instance, the nonwoven fabric may comprise a transition region between the first larger diameter segment and the first smaller diameter segment. In such embodiments of the invention, for example, the transition region may comprise a shoulder or shoulder-like structure or a sloped, gradual structure as previously discussed herein.

In accordance with certain embodiments of the invention, for instance, the plurality of segmented fibers may comprise meltspun fibers. In certain embodiments of the invention, for example, the plurality of segmented fibers may comprise melt blown fibers. In further embodiments of the invention, for instance, the plurality of segmented fibers may comprise spunbond fibers. In certain embodiments of the invention, for example, the plurality of segmented fibers may comprise extensible non-elastic filaments. In some embodiments of the invention, for instance, the plurality of segmented fibers may comprise multicomponent fibers. In such embodiments of the invention, for example, the plurality of segmented fibers may comprise sheath/core bicomponent fibers. In other embodiments of the invention, for instance, the plurality of segmented fibers may comprise side-by-side bicomponent fibers. According to certain embodiments of the invention, for example, the plurality of segmented fibers may comprise at least one of a polypropylene, a polyethylene, a propylene-ethylene random copolymer, a propylene-ethylene block copolymer, a polyethylene terephthalate, a polybutylene terephthalate, a polytrimethylene terephthalate, a polylactic acid, a polyamide, or any combination thereof. In some embodiments of the invention, for instance, the plurality of segmented fibers may comprise a polypropylene. In such embodiments of the invention, for example, the polypropylene may have a melt flow rate from about 10 g/10 min to about 2000 g/10 min at 230° C. tested at 230° C. according to ASTM 1238 and 2.16 kg. In other embodiments of the invention, for instance, the polypropylene may have a melt flow rate from about 20 g/10 min to about 500 g/10 min at 230° C. tested at 230° C. according to ASTM 1238 and 2.16 kg. In further embodiments of the invention, for example, the polypropylene may have a melt flow rate from about 25 g/10 min to about 100 g/10 min at 230° C. tested at 230° C. according to ASTM 1238 and 2.16 kg. In some embodiments of the invention, for instance, the polypropylene may have a melt flow rate of about 35 g/10 min at 230° C. and 2.16 kg. As such, in certain embodiments of the invention, the polypropylene may have a melt flow rate at 230° C. tested at 230° C. according to ASTM 1238 and 2.16 kg from at least about any of the following: 5, 10, 15, 20, 25, 30, and 35 g/10 min tested at 230° C. according to ASTM 1238 and/or at most about 2000, 1000, 500, 250, 100, and 35 g/10 min tested at 230° C. according to ASTM 1238 (e.g., about 30-2000 g/10 min tested at 230° C. according to ASTM 1238, about 10-40 g/10 min tested at 230° C. according to ASTM 1238, etc.).

In accordance with certain embodiments of the invention, for example, the nonwoven fabric may have a basis weight from about 1 gsm to about 400 gsm. In other embodiments of the invention, for instance, the nonwoven fabric may have a basis weight from about 1 gsm to about 200 gsm. In further embodiments of the invention, for example, the nonwoven fabric may have a basis weight from about 1 gsm to about 100 gsm. In some embodiments of the invention, for instance, the nonwoven fabric may have a basis weight of about 40 gsm. As such, in certain embodiments of the invention, the nonwoven fabric may have a basis weight from at least about any of the following: 1, 10, 20, 30, and 40 gsm and/or at most about 400, 300, 200, 100, and 40 gsm (e.g., about 30-400 gsm, about 1-300 gsm, etc.).

In accordance with certain embodiments of the invention, for example, the plurality of segmented fibers may comprise about 0.1 wt % to about 10 wt % of an additive. In such embodiments of the invention, for instance, the additive may comprise at least one of a calcium carbonate additive, a titanium oxide additive, a $BaSO_4$ additive, a talc additive, a nanoclay additive, or any combination thereof. According to certain embodiments of the invention, for example, the nanofiber fabric may further comprise at least one of a colorant, a fluorochemical, an antistatic agent, a hydrophilic agent, mineral fine particles, or any combination thereof.

IV. Multi-Layer Composite

In yet another aspect, certain embodiments of the invention provide a multi-layer composite. The multi-layer composite includes at least two layers, such that at least one layer comprises a nonwoven fabric. The nonwoven fabric for a given layer of the multi-layer composite may comprise a plurality of segmented fibers, as disclosed herein, such that each of the plurality of segmented fibers for a given layer of the multi-layer composite may comprise a fiber axis and a plurality of alternating larger diameter segments and smaller diameter segments along the fiber axis. The plurality of segmented fibers may be substantially aligned in a first direction (e.g., a cross direction or a machine direction).

In accordance with certain embodiments of the invention, for instance, the multi-layer composite may further comprise at least one non-segmented layer, such as an additional nonwoven layer which is devoid of segmented fibers. In certain embodiments of the invention, for example, the multi-layer composite may further comprise at least one film layer. In this regard, multi-layer composites according to certain embodiments of the invention may comprise (i) at least one layer comprising a nonwoven fabric including segmented fibers as disclosed herein, (ii) at least one nonwoven or woven layer being devoid of segmented fibers as disclosed herein, and/or (iii) at least one film layer. Accordingly, in certain embodiments of the invention, for instance, the multi-layer composite may comprise two nonwoven fabric layers, in which one or both of the nonwoven fabrics comprises segmented fibers as disclosed herein, and a film layer.

In accordance with certain embodiments of the invention, for example, the at least two layers may be cross-lapped and bonded. In such embodiments of the invention, for instance, the multi-layer composite may be configured such that any channels or bands created by stretching the fibers may be at angles to each other. In certain embodiments, for example, a first nonwoven fabric comprising segmented fibers substantially aligned or oriented in a first direction may be laid directly or indirectly onto or over a second nonwoven fabric comprising segmented fibers substantially aligned or oriented in a second direction, in which the first direction and the second direction are not the same. For instance, the first direction may be considered to be at 0° (as a point of reference) and the second direction may comprise 90° relative to the first direction (e.g., from between 5-175°, 20-160°, 40-140°, 60-120°, 80-100° relative to the first direction. In other embodiments of the invention, for example, the at least two layers may be layered together and laminated (e.g., each layer being laid with segmented fibers being substantially aligned or oriented in substantially the same direction). In certain embodiments of the invention, for instance, the at least two layers may be laminated via ultrasonic bonding or, for example, other bonding techniques as disclosed herein.

In accordance with certain embodiments of the invention, for example, at least one or each of the plurality of segmented fibers may be substantially continuous. In some embodiments of the invention, for instance, the plurality of alternating larger diameter segments and smaller diameter segments may be arranged in a coarse-fine-coarse-fine alternating pattern.

In accordance with certain embodiments of the invention the plurality of segmented fibers for a given layer of the multi-layer composite may be substantially aligned in a first direction. In certain embodiments of the invention, for example, the first direction may comprise a cross direction. In some embodiments of the invention, for instance, the plurality of segmented fibers for a given layer of the multi-layer composite may comprise a machine direction elongation and a cross direction elongation, and the machine direction elongation may be greater than the cross direction elongation. In such embodiments of the invention, for example, the machine direction elongation at break for a given layer of the multi-layer composite may be at least 3 times longer than the cross direction (e.g., the direction in which the plurality of segmented fibers are aligned) elongation at break (e.g., at least 3.5, 4, 4.5, 5, 6, 7, or 8 times longer than the cross direction at break). In further embodiments of the invention, for instance, the plurality of segmented fibers for a given layer of the multi-layer composite may comprise a cross direction tensile strength and a machine direction tensile strength, and the cross direction tensile strength may be at least 2 times stronger than the machine direction tensile strength, for example, at 50% elongation or at break. In accordance with certain embodiments of the invention, the direction in which the plurality of segmented fibers for a given layer of the multi-layer composite have been substantially aligned, such as the cross direction, may comprise a tensile strength be at least 2 times stronger (e.g., at least about 2.5, 3, 4, or 5 times stronger) than the perpendicular direction (e.g., machine direction) tensile strength, for example, at 50% elongation or at break. In accordance with certain multi-layer composite embodiments of the invention, the overall machine direction and cross direction properties of the multi-layer composite may vary from the individual layers of the multi-layer composite and may also vary, for example, depending on the lay-up orientations of the respective nonwoven fabric layers relative to each other. As noted above, each of the respective nonwoven fabric layers may be independently laid relative to adjacent nonwoven fabric layers. By way of example only, embodiments of the invention may comprise a first nonwoven fabric comprising segmented fibers substantially aligned or oriented in a first direction laid directly or indirectly onto or over a second nonwoven fabric comprising segmented fibers substantially aligned or oriented in a second direction, in which the first direction and the second direction are not the same. For instance, the first direction may be considered to be at 0° (as a point of reference) and the second direction may comprise 90° relative to the first direction (e.g., from between 5-175°, 20-160°, 40-140°, 60-120°, 80-100° relative to the first direction. In this regard, the overall machine direction and cross direction properties of the multi-layer composite may be tailored or configured to achieve one or more desired overall machine direction and/or cross direction properties by varying, for example, the number of individual nonwoven fabric layers (e.g., in which some or all of the individual nonwoven fabric layers comprise a plurality of segmented fibers as described herein). Additionally or alternatively to, the overall machine direction and cross direction properties of the multi-layer composite may be tailored or configured to achieve one or more desired overall machine direction and/or cross direction properties by varying the respective lay-up orientations (as described above) of each individual nonwoven fabric layers (e.g., in which some or all of the individual nonwoven fabric layers comprise a plurality of segmented fibers as described herein). By way of example only, certain multi-layer composite embodiments of the invention may comprise a plurality of individual nonwoven fabric layers, in which each nonwoven fabric layer is stretched and laid-up in the same or common direction (e.g., cross direction). After bonding such example embodiments of the invention, the cross direction tensile strength may be significantly higher than the machine direction tensile strength for the overall multi-layer composite. In other multi-layer composite embodiments of the invention, for example, a plurality of individual nonwoven fabric layers may be cross-lapped relative to adjacent individual nonwoven fabric layers (e.g., from between 5-175°, 20-160°, 40-140°, 60-120°, 80-100° relative to adjacent individual nonwoven fabric layers). After bonding such example embodiments of the invention, the difference of tensile strength between the cross direction and the machine direction may be much less significant. In this regard, certain multi-layer composite embodiments according to the invention may be configured or tailored for realization of one or more desired overall machine direction and/or cross direction properties.

In accordance with certain multi-layer composite embodiments of the invention, the multi-layer composite may comprise a cross direction elongation and a machine direction elongation. In accordance with certain embodiments of the invention, the machine direction elongation of the multi-layer composite may comprise no greater than three times the cross direction elongation. In other embodiments of the invention, the machine direction elongation of the multi-layer composite may comprise no greater than twice the cross direction elongation. As such, in certain embodiments of the invention, the machine direction elongation of the multi-layer composite may comprise at least about any of the following: 5%, 10%, 20%, 30%, and 40% greater than the cross direction elongation of the multi-layer composite and/or at most about 400%, 350%, 300%, 200%, 150%, 100%, and 50% greater than the cross direction elongation of the multi-layer composite.

In accordance with certain embodiments of the invention, for example, at least one of the larger diameter segments may have a diameter from about 1 µm to about 100 µm, and at least one of the smaller diameter segments may have a diameter from about 0.5 µm to about 25 µm. In other embodiments of the invention, for instance, at least one of the larger diameter segments may have a diameter from about 1.5 µm to about 50 µm, and at least one of the smaller diameter segments may have a diameter from about 0.75 µm to about 20 µm. In further embodiments of the invention, for example, at least one of the larger diameter segments may have a diameter from about 2 µm to about 25 µm, and at least one of the smaller diameter segments may have a diameter from about 1 µm to about 18 µm. As such, in certain embodiments of the invention, at least one of the larger diameter segments may have a diameter from at least about any of the following: 1, 1.25, 1.5, 1.75, and 2 µm and/or at most about 100, 75, 50, 40, and 25 µm (e.g., about 1.5-50 µm, about 2-100 µm, etc.). In further embodiments of the invention, at least one of the smaller diameter segments may have a diameter from at least about any of the following: 0.5, 0.6, 0.75, 0.9, and 1 µm and/or at most about 25, 23, 20, 19, and 18 µm (e.g., about 0.75-23 µm, about 0.9-25 µm, etc.).

According to certain embodiments of the invention, for instance, the plurality of segmented fibers may have an average fiber diameter from about 0.1 µm to about 100 µm. In other embodiments of the invention, for example, the plurality of segmented fibers may have an average fiber diameter from about 0.5 µm to about 50 µm. In further embodiments of the invention, for instance, the plurality of segmented fibers may have an average fiber diameter from about 1 µm to about 25 µm. As such, in certain embodiments of the invention, the plurality of segmented fibers may have an average fiber diameter from at least about any of the following: 0.1, 0.25, 0.5, 0.75, and 1 µm and/or at most about 100, 75, 50, 30, and 25 µm (e.g., about 0.5-50 µm, about 1-75 µm, etc.).

In accordance with certain embodiments of the invention, for example, the plurality of alternating larger diameter segments and smaller diameter segments may have a fiber diameter change $\Delta d_f$ as previously discussed and disclosed herein between a first larger diameter segment and a first smaller diameter segment calculated according to Equation 1, and the fiber diameter change $\Delta d_f$ may comprise from about 5% to about 60%. In other embodiments of the invention, for instance, the fiber diameter change $\Delta d_f$ may comprise from about 20% to about 50%. In further embodiments of the invention, for example, the fiber diameter change $\Delta d_f$ may comprise from about 30% to about 40%. As such, in certain embodiments of the invention, the fiber diameter change $\Delta d_f$ may comprise from at least about any of the following: 3, 4, 5, 12, 20, 25, and 30% and/or at most about 75, 70, 65, 60, 55, 50, 45, 40, and 35% (e.g., about 12-55%, about 25-45%, etc.). According to certain embodiments of the invention, for instance, at least one of the larger diameter segments may have a diameter that is at least 6% larger than at least one of the smaller diameter segments. In some embodiments of the invention, for example, at least one of the larger diameter segments may have a diameter that is at least 10% larger than at least one of the smaller diameter segments.

In accordance with certain embodiments of the invention, for instance, the nonwoven fabric may comprise a transition region between the first larger diameter segment and the first smaller diameter segment as previously disclosed and discussed herein. In such embodiments of the invention, for example, the transition region may comprise a shoulder or shoulder-like structure or a sloped, gradual structure as previously discussed herein.

In accordance with certain embodiments of the invention, for instance, the plurality of segmented fibers may comprise meltspun fibers. In certain embodiments of the invention, for example, the plurality of segmented fibers may comprise melt blown fibers. In further embodiments of the invention, for instance, the plurality of segmented fibers may comprise spunbond fibers. In certain embodiments of the invention, for example, the plurality of segmented fibers may comprise extensible non-elastic filaments. In some embodiments of the invention, for instance, the plurality of segmented fibers may comprise multicomponent fibers. In such embodiments of the invention, for example, the plurality of segmented fibers may comprise sheath/core bicomponent fibers. In other embodiments of the invention, for instance, the plurality of segmented fibers may comprise side-by-side bicomponent fibers. According to certain embodiments of the invention, for example, the plurality of segmented fibers may comprise at least one of a polypropylene, a polyethylene, a propylene-ethylene random copolymer, a propylene-ethylene block copolymer, a polyethylene terephthalate, a polybutylene terephthalate, a polytrimethylene terephthalate, a polylactic acid, a polyamide, or any combination thereof. In some embodiments of the invention, for instance, the plurality of segmented fibers may comprise a polypropylene. In such embodiments of the invention, for example, the polypropylene may have a melt flow rate from about 10 g/10 min to about 2000 g/10 min at 230° C. tested at 230° C. according to ASTM 1238 and 2.16 kg. In other embodiments of the invention, for instance, the polypropylene may have a melt flow rate from about 20 g/10 min to about 500 g/10 min at 230° C. tested at 230° C. according to ASTM 1238 and 2.16 kg. In further embodiments of the invention, for example, the polypropylene may have a melt flow rate from about 25 g/10 min to about 100 g/10 min at 230° C. tested at 230° C. according to ASTM 1238 and 2.16 kg. In some embodiments of the invention, for instance, the polypropylene may have a melt flow rate of about 35 g/10 min at 230° C. tested at 230° C. according to ASTM 1238 and 2.16 kg. As such, in certain embodiments of the invention, the polypropylene may have a melt flow rate at 230° C. tested at 230° C. according to ASTM 1238 and 2.16 kg from at least about any of the following: 5, 10, 15, 20, 25, 30, and 35 g/10 min tested at 230° C. according to ASTM 1238 and/or at most about 2000, 1000, 500, 250, 100, and 35 g/10 min tested at 230° C. according to ASTM 1238 (e.g., about 30-2000 g/10 min tested at 230° C. according to ASTM 1238, about 5-40 g/10 min tested at 230° C. according to ASTM 1238, etc.).

In accordance with certain embodiments of the invention, for example, the nonwoven fabric may have a basis weight from about 1 gsm to about 400 gsm. In other embodiments of the invention, for instance, the nonwoven fabric may have a basis weight from about 1 gsm to about 200 gsm. In further embodiments of the invention, for example, the nonwoven fabric may have a basis weight from about 1 gsm to about 100 gsm. In some embodiments of the invention, for instance, the nonwoven fabric may have a basis weight of about 40 gsm. As such, in certain embodiments of the invention, the nonwoven fabric may have a basis weight from at least about any of the following: 1, 10, 20, 30, and 40 gsm and/or at most about 400, 300, 200, 100, and 40 gsm (e.g., about 30-400 gsm, about 1-300 gsm, etc.).

In accordance with certain embodiments of the invention, for example, the plurality of segmented fibers may comprise about 0.1 wt % to about 10 wt % of an additive. In such embodiments of the invention, for instance, the additive may comprise at least one of a calcium carbonate additive, a titanium oxide additive, a $BaSO_4$ additive, a talc additive, a nanoclay additive, or any combination thereof. According to certain embodiments of the invention, for example, the nanofiber fabric may further comprise at least one of a colorant, a fluorochemical, an antistatic agent, a hydrophilic agent, mineral fine particles, or any combination thereof.

Figure 12:
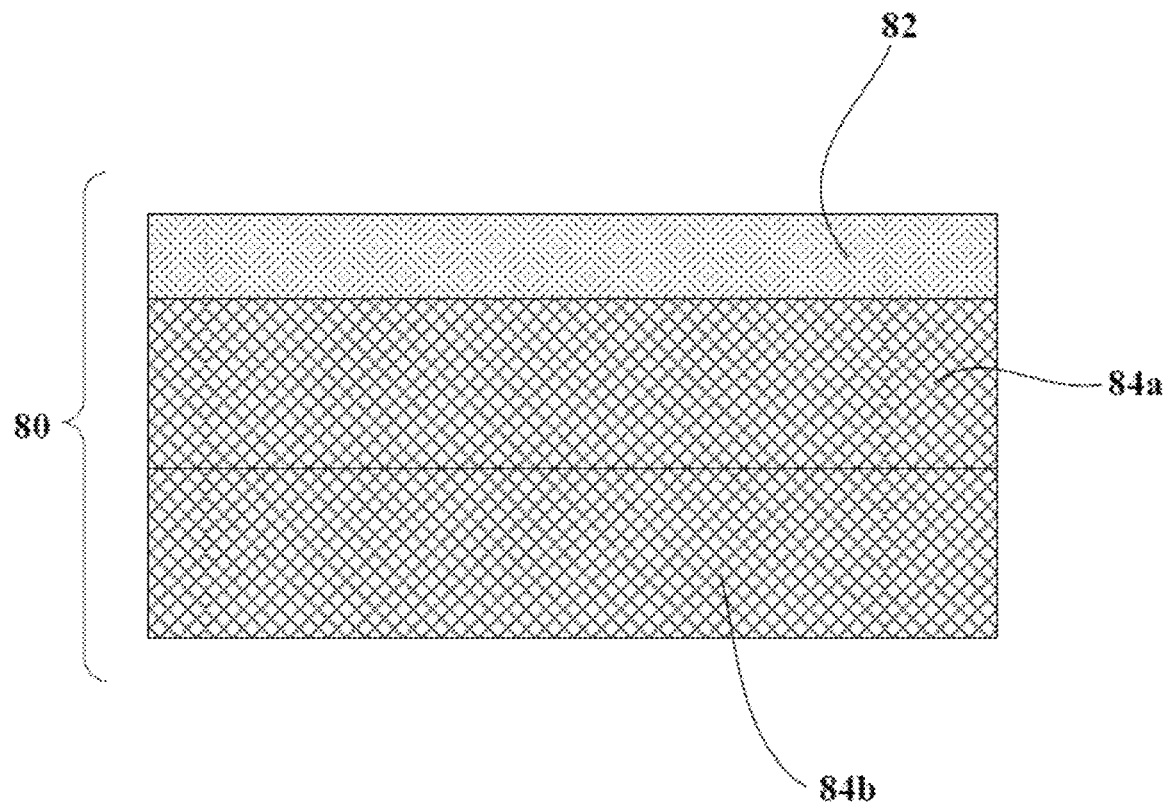
FIG. 12 illustrates a multi-layer composite according to an embodiment of the invention.

FIG. 12, for example, illustrates a multi-layer composite according to an embodiment of the invention. As shown in FIG. 12, the multi-layer composite 80 includes a first nonwoven fabric 84a, a second nonwoven fabric 84b, and a film 82 disposed on the first nonwoven fabric 84a. Either one or both of the nonwoven fabric layers 84a, 84b may comprise a plurality of substantially aligned segmented fibers according to certain embodiments of the invention. Although the embodiment illustrated in FIG. 12 illustrates the film 82 forming an outer surface of the multi-layer composite 80, the film 82 may also be positioned between the two nonwoven layers 84a, 84b, such that the film layer is sandwiched between the two nonwoven layers.

Thus, the invention includes, according to certain embodiments, a nonwoven fabric comprising a plurality of segmented fibers. At least one or each of the plurality of segmented fibers may comprise a fiber axis and a plurality of alternating larger diameter and smaller diameter segments along the fiber axis. The plurality of segmented fibers may be substantially aligned in a first direction (e.g., a cross direction or a machine direction). As such, the nonwoven fabric may be suitable for a wide variety of applications including healthcare (e.g., high absorbency drapes and breathable gowns, medical tapes, medical packaging, hygiene cover sheets, etc.), filtration, industrial, packaging and/or the like.

EXAMPLES

The present disclosure is further illustrated by the following examples, which in no way should be construed as being limiting. That is, the specific features described in the following examples are merely illustrative and not limiting.

Test Methods

Basis weight of the following examples was measured in a way that is consistent with the test method ASTM D3776. The results were provided in units of mass per unit area in $g/m^2$ (gsm).

Melt flow rate of the following examples was measured in a way that is consistent with the test method ASTM 1238. The results were provided in units of mass per 10 minute in g/10 min.

Sample Preparation

All samples were made by first using a Biax Fiberfilm style melt blown machine equipped with a spinneret having 4 rows of spinning nozzles having an inside diameter of 0.020 inches and corresponding concentric air holes to form 40 gsm melt blown webs. All sample melt blown webs were made using a polypropylene resin having a melt flow rate of 35 g/10 min such as PP3155 from ExxonMobil Chemical, 22777 Springwoods Village Parkway, Spring, Tex. 77389-1425, USA. The melt blown webs were then fed into a cross direction (CD) stretching machine, such as MICROSPAN™ from Biax Fiberfilm Corporation, N1001 Tower View Drive, Greenville, Wis. 54942-8030, USA, having a pair of inter-digitating rollers of grooves substantially perpendicular to the axis of said rollers. Such stretching machines have peak-to-peak groove spacing of 6 mm and groove depth of 8 mm. The engagement of the rollers was set for 1.5 mm by adjusting the positioning device attached to the machine. The rollers were operated at a surface speed of 2 m/min (although higher speeds may be used). The exiting stretched web proceeded over a series of spreader rolls and idler rolls to be flattened out and was then wound up into a roll with a wider width. This roll passed the stretching station once so that the web was stretched once. The stretched web was subsequently fed into the same CD stretching machine having the same setup and operating speed such that the same stretching process described above was repeated and the web was stretched twice.

Example 1

In Example 1, the melt blown web was a 40 gsm web made of 100% PP3155 from ExxonMobil Chemical, 22777 Springwoods Village Parkway, Spring, Tex. 77389-1425, USA. The sample fabric was made according to the steps described above, which were repeated 4 times before filament breakage was observed.

Example 2

In Example 2, the melt blown web was a 40 gsm web made of 90% PP3155 from ExxonMobil Chemical, 22777 Springwoods Village Parkway, Spring, Tex. 77389-1425, USA and 10% calcium carbonate polypropylene master batch from Standridge Color Corporation, 111 Stewart Parkway, Greensboro, Ga. 30642, USA. The master batch contained between 60 to 80 wt % calcium carbonate. The sample fabric was made according to the steps described above, which were repeated 3 times before filament breakages were observed.

Table 1 illustrates the fiber diameter change $\Delta d_f$ for Examples 1 and 2:

TABLE 1

|  |  | Example 1 Stretched 4 Times | | Example 2 Stretched 3 Times | |
| --- | --- | --- | --- | --- | --- |
|  |  | Fiber Diameter $d_f$ (µm) | Diameter Change $\Delta d_f$ | Fiber Diameter $d_f$ (µm) | Diameter Change $\Delta d_f$ |
| Filament 1 | $d_{f,l}$ | 9.464 |  | 3.365 |  |
|  | $d_{f,s}$ | 5.011 | 47% | 2.337 | 31% |
|  | $d_{f,l}$ | 10.62 | 53% | 4.387 | 47% |
| Filament 2 | $d_{f,l}$ | 6.642 |  | 6.582 |  |
|  | $d_{f,s}$ | 3.187 | 52% | 4.002 | 39% |
|  | $d_{f,l}$ | 6.48 | 51% | 7.446 | 46% |
| Filament 3 | $d_{f,l}$ | 10.3 |  | 9.616 |  |
|  | $d_{f,s}$ | 6.335 | 38% | 4.566 | 53% |
|  | $d_{f,l}$ | 10.3 | 38% | 9.308 | 51% |
| Filament 4 | $d_{f,l}$ | 9.469 |  | 9.422 |  |
|  | $d_{f,s}$ | 6.207 | 34% | 7.123 | 24% |
|  | $d_{f,l}$ | 8.406 | 26% | 10.02 | 29% |
| Filament 5 | $d_{f,l}$ | 3.355 |  | 19.2 |  |
|  | $d_{f,s}$ | 1.879 | 44% | 14.22 | 26% |
|  | $d_{f,l}$ | 2.535 | 26% | 18.77 | 24% |

TABLE 1-continued

|  |  | Example 1 Stretched 4 Times | | Example 2 Stretched 3 Times | |
|---|---|---|---|---|---|
|  |  | Fiber Diameter $d_f$ (μm) | Diameter Change $\Delta d_f$ | Fiber Diameter $d_f$ (μm) | Diameter Change $\Delta d_f$ |
| Filament 6 | $d_{f,1}$ | 2.856 |  | 9.71 |  |
|  | $d_{f,s}$ | 1.905 | 33% | 6.683 | 31% |
|  | $d_{f,1}$ | 2.128 | 10% | 11.03 | 39% |
| Filament 7 | $d_{f,1}$ | 4.533 |  | 18.17 |  |
|  | $d_{f,s}$ | 1.825 | 60% | 12.55 | 31% |
|  | $d_{f,1}$ | 4.616 | 60% | 17.26 | 27% |
| Filament 8 | $d_{f,1}$ | 4.309 |  | 21.22 |  |
|  | $d_{f,s}$ | 2.791 | 31% | 15.19 | 28% |
|  | $d_{f,1}$ | 5.367 | 48% | 22.8 | 33% |
| Filament 9 | $d_{f,1}$ | 12.08 |  | 3.164 |  |
|  | $d_{f,s}$ | 7.596 | 37% | 2.517 | 20% |
|  | $d_{f,1}$ | 11.73 | 35% | 4.182 | 40% |
| Filament 10 | $d_{f,1}$ | 5.314 |  | 2.362 |  |
|  | $d_{f,s}$ | 3.15 | 41% | 1.102 | 53% |
|  | $d_{f,1}$ | 5.225 | 40% | 2.812 | 61% |
| Filament 11 | $d_{f,1}$ | 8.043 |  | 10.91 |  |
|  | $d_{f,s}$ | 10.56 | 24% | 8.491 | 22% |
|  | $d_{f,1}$ | 6.693 | 37% | 14.66 | 42% |
| Filament 12 | $d_{f,1}$ | 4.974 |  | 17.14 |  |
|  | $d_{f,s}$ | 2.798 | 44% | 9.111 | 47% |
|  | $d_{f,1}$ | 4.199 | 33% | 16.32 | 44% |
| Filament 13 | $d_{f,1}$ | 4.826 |  | 6.592 |  |
|  | $d_{f,s}$ | 2.844 | 41% | 3.51 | 47% |
|  | $d_{f,1}$ | 4.058 | 30% | 6.156 | 43% |
| Filament 14 | $d_{f,1}$ | 5.199 |  | 5.474 |  |
|  | $d_{f,s}$ | 4.977 | 4% | 3.832 | 30% |
|  | $d_{f,1}$ | 5.232 | 5% | 6.3 | 39% |
| Filament 15 | $d_{f,1}$ | 7.729 |  | 13.58 |  |
|  | $d_{f,s}$ | 4.369 | 43% | 11.44 | 16% |
|  | $d_{f,1}$ | 7.906 | 45% | 14.87 | 23% |
| Filament 16 | $d_{f,1}$ | 9.126 |  | 7.838 |  |
|  | $d_{f,s}$ | 7.449 | 18% | 4.974 | 37% |
|  | $d_{f,1}$ | 9.463 | 21% | 7.707 | 35% |
| Filament 17 | $d_{f,1}$ | 8.4 |  | 7.798 |  |
|  | $d_{f,s}$ | 4.769 | 43% | 5.45 | 30% |
|  | $d_{f,1}$ | 8.787 | 46% | 6.567 | 17% |
| Filament 18 | $d_{f,1}$ | 13.48 |  | 14.5 |  |
|  | $d_{f,s}$ | 8.854 | 34% | 10.65 | 27% |
|  | $d_{f,1}$ | 12.35 | 28% | 14.87 | 28% |
| Filament 19 | $d_{f,1}$ | 5.772 |  | 6.532 |  |
|  | $d_{f,s}$ | 2.733 | 53% | 3.783 | 42% |
|  | $d_{f,1}$ | 4.939 | 45% | 4.878 | 22% |
| Filament 20 | $d_{f,1}$ | 11.93 |  | 6.822 |  |
|  | $d_{f,s}$ | 6.731 | 44% | 4.107 | 40% |
|  | $d_{f,1}$ | 11.79 | 43% | 5.934 | 31% |
|  |  | Average → | 37% | Average → | 35% |

As such, Table 1 illustrates that the nonwoven fabric has a plurality of fibers having alternating fiber diameters with a pattern of "large-small-large-small" or "coarse-fine-coarse-fine" along corresponding fiber axes and a fiber diameter change $\Delta d_f$ ranging from 10 to 60% with an average between 30% and 40%. Accordingly, Examples 1 and 2 provide nonwoven fabrics having unique physical structure and characteristics.

These and other modifications and variations to the invention may be practiced by those of ordinary skill in the art without departing from the spirit and scope of the invention, which is more particularly set forth in the appended claims. In addition, it should be understood that aspects of the various embodiments may be interchanged in whole or in part. Furthermore, those of ordinary skill in the art will appreciate that the foregoing description is by way of example only, and it is not intended to limit the invention as further described in such appended claims. Therefore, the spirit and scope of the appended claims should not be limited to the exemplary description of the versions contained herein.

That which is claimed:

1. A nonwoven fabric, comprising:
   a plurality of incrementally-stretched meltspun segmented fibers,
   wherein each of the plurality of incrementally-stretched meltspun segmented fibers comprises a fiber axis and a plurality of alternating larger diameter segments and smaller diameter segments along the fiber axis, each of the plurality of incrementally-stretched meltspun fibers having from 5 to 50 discrete larger diameter segments separated by the plurality of smaller diameter segments per linear meter, and
   wherein the plurality of incrementally-stretched meltspun fibers include a first meltspun fiber having a first larger diameter segment and smaller diameter segment along a first fiber axis of the first meltspun fiber; wherein the plurality of incrementally-stretched meltspun segmented fibers are incrementally-stretched at least three times in a first direction and substantially aligned in the first direction, and wherein the first larger diameter segment has a first linear length and the first smaller diameter segments has a second linear length, and wherein the second linear length is greater than the first linear length; and wherein the first direction comprises a cross direction, and wherein the plurality of incrementally-stretched meltspun segmented fibers comprise a machine direction elongation and a cross direction elongation, the machine direction elongation being greater than the cross direction elongation.

2. The nonwoven fabric according to claim 1, wherein the machine direction elongation at break is at least 3 times longer than the cross direction elongation at break.

3. The nonwoven fabric according to claim 1, wherein the first direction comprises a cross direction, and wherein the plurality of incrementally-stretched meltspun segmented fibers comprise a cross direction tensile strength and a machine direction tensile strength, the cross direction tensile strength being at least 2 times stronger than the machine direction tensile strength.

4. The nonwoven fabric according to claim 1, wherein at least one of the larger diameter segments has a diameter from 1 μm to 100 μm, and at least one of the smaller diameter segments has a diameter from 0.5 μm to 25 μm.

5. The nonwoven fabric according to claim 1, wherein the plurality of alternating larger diameter segments and smaller diameter segments have a fiber diameter change $\Delta d_f$ between a first larger diameter segment and a first smaller diameter segment, and the fiber diameter change $\Delta d_f$ comprises from 5% to 60%.

6. The nonwoven fabric according to claim 1, wherein at least one of the larger diameter segments has a diameter that is at least 6% larger than at least one of the smaller diameter segments.

7. The nonwoven fabric according to claim 1, wherein each of the plurality of incrementally-stretched meltspun segmented fibers comprises a transition region between a respective first larger diameter segment and a respective first smaller diameter segment.

8. The nonwoven fabric according to claim 7, wherein the transition region comprises a shoulder-like structure.

9. The nonwoven fabric according to claim 1, wherein the plurality of incrementally-stretched meltspun segmented fibers comprise extensible non-elastic filaments.

10. The nonwoven fabric according to claim 1, wherein the plurality of incrementally-stretched meltspun segmented fibers comprise at least one of a polypropylene, a polyethylene, a propylene-ethylene random copolymer, a propylene-ethylene block copolymer, a polyethylene terephthalate, a polybutylene terephthalate, a polytrimethylene terephthalate, a polylactic acid, a polyamide, or any combination thereof.

11. The nonwoven fabric according to claim 10, wherein the plurality of incrementally-stretched meltspun segmented fibers comprise a polypropylene comprising a melt flow rate from 10 g/10 min to 2000 g/10 min tested at 230° C. according to ASTM 1238.

12. A multi-layer composite, comprising:
at least two layers, the at least two layers including at least one layer comprising a nonwoven fabric;
wherein the nonwoven fabric comprises a plurality of incrementally-stretched meltspun segmented fibers, wherein each of the plurality of incrementally-stretched meltspun segmented fibers comprises a fiber axis and a plurality of alternating larger diameter segments and smaller diameter segments along the fiber axis, each of the plurality of incrementally-stretched meltspun fibers having from 5 to 50 discrete larger diameter segments separated by the plurality of smaller diameter segments per linear meter, and
wherein the plurality of incrementally-stretched meltspun fibers include a first meltspun fiber having a first larger diameter segment and smaller diameter segment along a first fiber axis of the first meltspun fiber; wherein the plurality of incrementally-stretched meltspun segmented fibers are incrementally-stretched at least three times in a first direction and substantially aligned in the first direction, and wherein the first larger diameter segments has a first linear length and the first smaller diameter segments has a second linear length, and wherein the second linear length is greater than the first linear length; and wherein the first direction comprises a cross direction, and wherein the plurality of incrementally-stretched meltspun segmented fibers comprise a machine direction elongation and a cross direction elongation, the machine direction elongation being greater than the cross direction elongation.

13. The multi-layer composite according to claim 12, further comprising at least one non-segmented layer, at least one film layer, or both.

14. The multi-layer composite according to claim 12, wherein the at least two layers comprise (i) a first nonwoven fabric defined by the nonwoven fabric comprising a plurality of incrementally-stretched meltspun segmented fibers and (ii) a second nonwoven fabric, the first and second nonwoven fabrics being cross-lapped and bonded together.

15. The nonwoven fabric according to claim 1, wherein the plurality of incrementally-stretched meltspun segmented fibers consist of (i) at least one polymeric material consisting of a polypropylene, a polyethylene, a propylene-ethylene random copolymer, a propylene-ethylene block copolymer, a polyethylene terephthalate, a polybutylene terephthalate, a polytrimethylene terephthalate, or any combination thereof; and (ii) at least one additive; wherein the at least one additive consists of calcium carbonate, titanium oxide, a barium sulfate, talc, a nanoclay, a colorant, a fluorochemical, an antistatic agent, or any combination thereof.

16. The nonwoven fabric according to claim 15, wherein the at least one polymeric material is polypropylene, polyethylene, a propylene-ethylene random copolymer, a propylene-ethylene block copolymer, or any combination thereof.

17. The nonwoven fabric according to claim 16, wherein the at least one polymeric material is polypropylene.

18. The nonwoven fabric according to claim 1, wherein the plurality of incrementally-stretched meltspun segmented fibers are incrementally-stretched at least four times in a first direction, and each of the plurality of incrementally-stretched meltspun fibers have from 15 to 50 discrete larger diameter segments separated by the plurality of smaller diameter segments per linear meter.

19. The nonwoven fabric according to claim 1, wherein the nonwoven fabric is provided in a spread-out and flat configuration in a first direction and a second direction that is perpendicular to the first direction.

20. A nonwoven fabric, comprising:
a plurality of incrementally-stretched meltspun segmented fibers, wherein each of the plurality of incrementally-stretched meltspun segmented fibers comprises a fiber axis and a plurality of alternating larger diameter segments and smaller diameter segments along the fiber axis, each of the plurality of incrementally-stretched meltspun fibers having from 5 to 50 discrete larger diameter segments separated by the plurality of smaller diameter segments per linear meter, and
wherein the plurality of incrementally-stretched meltspun fibers include a first meltspun fiber having a first larger diameter segment and smaller diameter segment along a first fiber axis of the first meltspun fiber; wherein the plurality of incrementally-stretched meltspun segmented fibers are incrementally-stretched at least three times in a first direction and substantially aligned in the first direction, and wherein the first larger diameter segment has a first linear length and the first smaller diameter segments has a second linear length, and wherein the second linear length is greater than the first linear length; and
wherein the first direction comprises a cross direction, and wherein the plurality of incrementally-stretched meltspun segmented fibers comprise a cross direction tensile strength and a machine direction tensile strength, the cross direction tensile strength being at least 2 times stronger than the machine direction tensile strength.

21. A multi-layer composite, comprising:
at least two layers, the at least two layers including at least one layer comprising a nonwoven fabric; wherein the nonwoven fabric comprises a plurality of incrementally-stretched meltspun segmented fibers, wherein each of the plurality of incrementally-stretched meltspun segmented fibers comprises a fiber axis and a plurality of alternating larger diameter segments and smaller diameter segments along the fiber axis, each of the plurality of incrementally-stretched meltspun fibers having from 5 to 50 discrete larger diameter segments separated by the plurality of smaller diameter segments per linear meter, and
wherein the plurality of incrementally-stretched meltspun fibers include a first meltspun fiber having a first larger diameter segment and smaller diameter segment along a first fiber axis of the first meltspun fiber; wherein the plurality of incrementally-stretched meltspun segmented fibers are incrementally-stretched at least three times in a first direction and substantially aligned in the first direction, and wherein the first larger diameter segments has a first linear length and the first smaller diameter segments has a second linear length, and wherein the second linear length is greater than the first linear length; and wherein the first direction comprises a cross direction, and wherein the plurality of incrementally-stretched melt-spun segmented fibers comprise a cross direction tensile strength and a machine direction tensile strength, the cross direction tensile strength being at least 2 times stronger than the machine direction tensile strength.

\* \* \* \* \*

UNITED STATES PATENT AND TRADEMARK OFFICE
CERTIFICATE OF CORRECTION

PATENT NO. : 10,889,921 B2
APPLICATION NO. : 15/292223
DATED : January 12, 2021
INVENTOR(S) : Rongguo Zhao et al.

Page 1 of 1

It is certified that error appears in the above-identified patent and that said Letters Patent is hereby corrected as shown below:

In the Specification

Column 1, Line 8, "incorporate" should read --incorporated by--.

In the Claims

In Claim 12, Column 31, Line 30, "segments" should read --segment--.

In Claim 12, Column 31, Line 31, "segments" should read --segment--.

Signed and Sealed this
Eighth Day of June, 2021

Drew Hirshfeld
*Performing the Functions and Duties of the
Under Secretary of Commerce for Intellectual Property and
Director of the United States Patent and Trademark Office*